(12) United States Patent
Merewether

(10) Patent No.: US 12,304,082 B2
(45) Date of Patent: May 20, 2025

(54) ALTERNATE ROUTE FINDING FOR WAYPOINT-BASED NAVIGATION MAPS

(71) Applicant: Boston Dynamics, Inc., Waltham, MA (US)

(72) Inventor: Gene Brown Merewether, Chestnut Hill, MA (US)

(73) Assignee: Boston Dynamics, Inc., Waltham, MA (US)

( * ) Notice: Subject to any disclaimer, the term of this patent is extended or adjusted under 35 U.S.C. 154(b) by 310 days.

(21) Appl. No.: 17/805,005

(22) Filed: Jun. 1, 2022

(65) Prior Publication Data

US 2022/0388170 A1 Dec. 8, 2022

Related U.S. Application Data

(60) Provisional application No. 63/202,288, filed on Jun. 4, 2021.

(51) Int. Cl.
*B25J 9/16* (2006.01)
*B25J 19/02* (2006.01)

(52) U.S. Cl.
CPC ............ *B25J 9/1664* (2013.01); *B25J 9/162* (2013.01); *B25J 9/1697* (2013.01); *B25J 19/023* (2013.01)

(58) Field of Classification Search
None
See application file for complete search history.

(56) References Cited

U.S. PATENT DOCUMENTS

| | | |
|---|---|---|
| 5,111,401 A | 5/1992 | Everett et al. |
| 5,378,969 A | 1/1995 | Haikawa |

(Continued)

FOREIGN PATENT DOCUMENTS

| | | |
|---|---|---|
| CA | 2928262 | 7/2012 |
| CN | 102037317 A | 4/2011 |

(Continued)

OTHER PUBLICATIONS

Abraham et al., "A Topological Approach of Path Planning for Autonomous Robot Navigation in Dynamic Environments", The 2009 IEEE/RSJ International Conference on Intelligent Robots and Systems, Oct. 11-15, 2009, DOI: 10.1109/IROS.2009.5354771, pp. 4907-4912.

(Continued)

*Primary Examiner* — Kyle T Johnson
*Assistant Examiner* — Arslan Azhar
(74) *Attorney, Agent, or Firm* — Knobbe, Martens, Olson & Bear, LLP

(57) ABSTRACT

A computer-implemented method executed by data processing hardware of a robot causes the data processing hardware to perform operations including obtaining a topological map including waypoints and edges. Each edge connects adjacent waypoints. The waypoints and edges represent a navigation route for the robot to follow. Operations include determining, that an edge that connects first and second waypoints is blocked by an obstacle. Operations include generating, using image data and the topological map, one or more alternate waypoints offset from one of the waypoints. For each alternate waypoint, operations include generating an alternate edge connecting the alternate waypoint to a waypoint. Operations include adjusting the navigation route to include at least one alternate waypoint and alternate edge that bypass the obstacle. Operations include navigating the robot from the first waypoint to an alternate waypoint along the alternate edge connecting the alternate waypoint to the first waypoint.

24 Claims, 20 Drawing Sheets

(56) References Cited

U.S. PATENT DOCUMENTS

| | | |
|---|---|---|
| 7,211,980 B1 | 5/2007 | Bruemmer et al. |
| 7,865,267 B2 | 1/2011 | Sabe et al. |
| 7,912,583 B2 | 3/2011 | Gutmann et al. |
| 8,270,730 B2 | 9/2012 | Watson |
| 8,346,391 B1 | 1/2013 | Anhalt et al. |
| 8,401,783 B2 | 3/2013 | Hyung et al. |
| 8,548,734 B2 | 10/2013 | Barbeau et al. |
| 8,849,494 B1 | 9/2014 | Herbach et al. |
| 8,930,058 B1 | 1/2015 | Quist et al. |
| 9,352,470 B1 | 5/2016 | da Silva et al. |
| 9,561,592 B1 | 2/2017 | da Silva et al. |
| 9,574,883 B2 | 2/2017 | Watts et al. |
| 9,586,316 B1 | 3/2017 | Swilling |
| 9,594,377 B1 | 3/2017 | Perkins et al. |
| 9,717,387 B1 | 8/2017 | Szatmary et al. |
| 9,844,879 B1 | 12/2017 | Cousins et al. |
| 9,896,091 B1 | 2/2018 | Kurt et al. |
| 9,908,240 B1 | 3/2018 | da Silva et al. |
| 9,933,781 B1 | 4/2018 | Bando et al. |
| 9,969,086 B1 | 5/2018 | Whitman |
| 9,975,245 B1 | 5/2018 | Whitman |
| 10,081,098 B1 | 9/2018 | Nelson et al. |
| 10,081,104 B1 | 9/2018 | Swilling |
| 10,226,870 B1 | 3/2019 | Silva et al. |
| 10,639,794 B2 | 5/2020 | Cousins et al. |
| 11,175,664 B1 | 11/2021 | Boyraz et al. |
| 11,268,816 B2 | 3/2022 | Fay et al. |
| 11,287,826 B2 | 3/2022 | Whitman et al. |
| 11,416,003 B2 | 8/2022 | Whitman et al. |
| 11,480,974 B2 | 10/2022 | Lee et al. |
| 11,518,029 B2 | 12/2022 | Cantor et al. |
| 11,656,630 B2 | 5/2023 | Jonak et al. |
| 11,747,825 B2 | 9/2023 | Jonak et al. |
| 11,774,247 B2 | 10/2023 | Fay et al. |
| 2005/0131581 A1 | 6/2005 | Sabe et al. |
| 2006/0009876 A1 | 1/2006 | McNeil |
| 2006/0025888 A1 | 2/2006 | Gutmann et al. |
| 2006/0167621 A1 | 7/2006 | Dale |
| 2007/0233338 A1 | 10/2007 | Ariyur et al. |
| 2007/0282564 A1 | 12/2007 | Sprague et al. |
| 2008/0009966 A1 | 1/2008 | Bruemmer et al. |
| 2008/0027590 A1 | 1/2008 | Phillips et al. |
| 2008/0086241 A1 | 4/2008 | Phillips et al. |
| 2009/0125225 A1 | 5/2009 | Hussain et al. |
| 2010/0066587 A1 | 3/2010 | Yamauchi et al. |
| 2010/0172571 A1 | 7/2010 | Yoon et al. |
| 2011/0035087 A1 | 2/2011 | Kim et al. |
| 2011/0172850 A1 | 7/2011 | Paz-Meidan et al. |
| 2011/0224901 A1 | 9/2011 | Aben et al. |
| 2012/0089295 A1 | 4/2012 | Ahn et al. |
| 2012/0182392 A1 | 7/2012 | Kearns et al. |
| 2012/0323432 A1 | 12/2012 | Wong et al. |
| 2013/0141247 A1 | 6/2013 | Ricci |
| 2013/0231779 A1 | 9/2013 | Purkayastha et al. |
| 2013/0325244 A1 | 12/2013 | Wang et al. |
| 2014/0188325 A1 | 7/2014 | Johnson et al. |
| 2015/0158182 A1 | 6/2015 | Farlow et al. |
| 2015/0355638 A1 | 12/2015 | Field et al. |
| 2016/0375901 A1 | 12/2016 | di Cairano et al. |
| 2017/0017236 A1 | 1/2017 | Song et al. |
| 2017/0095383 A1 | 4/2017 | Li et al. |
| 2017/0120448 A1 | 5/2017 | Lee et al. |
| 2017/0131102 A1 | 5/2017 | Wirbel et al. |
| 2017/0203446 A1 | 7/2017 | Dooley et al. |
| 2018/0051991 A1 | 2/2018 | Hong |
| 2018/0161986 A1 | 6/2018 | Kee et al. |
| 2018/0173242 A1 | 6/2018 | Lalonde et al. |
| 2018/0328737 A1 | 11/2018 | Frey et al. |
| 2018/0348742 A1 | 12/2018 | Byme et al. |
| 2019/0016312 A1* | 1/2019 | Carlson ................ B60L 53/66 |
| 2019/0056743 A1 | 2/2019 | Alesiani et al. |
| 2019/0079523 A1 | 3/2019 | Zhu et al. |
| 2019/0080463 A1 | 3/2019 | Davison et al. |
| 2019/0113927 A1* | 4/2019 | England ................ G06F 16/285 |
| 2019/0138029 A1 | 5/2019 | Ryll et al. |
| 2019/0171911 A1 | 6/2019 | Greenberg |
| 2019/0187699 A1 | 6/2019 | Salour et al. |
| 2019/0187703 A1* | 6/2019 | Millard ................ G05D 1/249 |
| 2019/0213896 A1 | 7/2019 | Gohi et al. |
| 2019/0318277 A1 | 10/2019 | Goldman et al. |
| 2019/0332114 A1 | 10/2019 | Moroniti et al. |
| 2020/0039427 A1 | 2/2020 | Chen et al. |
| 2020/0109954 A1 | 4/2020 | Li et al. |
| 2020/0117198 A1 | 4/2020 | Whitman et al. |
| 2020/0117214 A1 | 4/2020 | Jonak et al. |
| 2020/0164521 A1 | 5/2020 | Li |
| 2020/0174460 A1 | 6/2020 | Byme et al. |
| 2020/0192388 A1 | 6/2020 | Zhang et al. |
| 2020/0198140 A1 | 6/2020 | Dupuis et al. |
| 2020/0216061 A1* | 7/2020 | Zidek ................ G05D 1/0238 |
| 2020/0249033 A1 | 8/2020 | Gelhar |
| 2020/0258400 A1 | 8/2020 | Yuan et al. |
| 2020/0333790 A1 | 10/2020 | Kobayashi et al. |
| 2020/0386882 A1 | 12/2020 | Klein et al. |
| 2020/0409382 A1 | 12/2020 | Herman et al. |
| 2021/0041243 A1* | 2/2021 | Fay ................ G01C 21/20 |
| 2021/0041887 A1 | 2/2021 | Whitman et al. |
| 2021/0064055 A1 | 3/2021 | Jun |
| 2021/0141389 A1 | 5/2021 | Jonak et al. |
| 2021/0180961 A1 | 6/2021 | Oh |
| 2021/0200219 A1* | 7/2021 | Gaschler ................ G05D 1/0274 |
| 2021/0311480 A1 | 10/2021 | Yang et al. |
| 2021/0323618 A1 | 10/2021 | Komoroski |
| 2021/0382491 A1 | 12/2021 | Murotani et al. |
| 2022/0024034 A1 | 1/2022 | Wei et al. |
| 2022/0063662 A1 | 3/2022 | Sprunk et al. |
| 2022/0083062 A1 | 3/2022 | Jaquez et al. |
| 2022/0088776 A1 | 3/2022 | Kuffner |
| 2022/0137637 A1 | 5/2022 | Baldini et al. |
| 2022/0155078 A1 | 5/2022 | Fay et al. |
| 2022/0179420 A1 | 6/2022 | Whitman et al. |
| 2022/0244741 A1 | 8/2022 | da Silva et al. |
| 2022/0276654 A1 | 9/2022 | Lee et al. |
| 2022/0342421 A1 | 10/2022 | Kearns |
| 2022/0374024 A1 | 11/2022 | Whitman et al. |
| 2022/0390950 A1 | 12/2022 | Yamauchi |
| 2022/0390954 A1 | 12/2022 | Klingensmith |
| 2023/0062175 A1 | 3/2023 | Yahata |
| 2023/0309776 A1 | 10/2023 | Li et al. |
| 2023/0359220 A1 | 11/2023 | Jonak et al. |
| 2023/0400307 A1 | 12/2023 | Fay et al. |
| 2023/0418297 A1 | 12/2023 | Komoroski et al. |
| 2024/0061436 A1 | 2/2024 | Tsuzaki et al. |
| 2024/0165821 A1 | 5/2024 | Dabiri et al. |
| 2024/0361779 A1 | 10/2024 | Dellon et al. |

FOREIGN PATENT DOCUMENTS

| | | |
|---|---|---|
| CN | 203371557 | 1/2014 |
| CN | 104075715 A | 10/2014 |
| CN | 104470685 A | 3/2015 |
| CN | 104536445 A | 4/2015 |
| CN | 106371445 A | 2/2017 |
| CN | 107301654 A | 10/2017 |
| CN | 107943038 A | 4/2018 |
| CN | 108052103 | 5/2018 |
| CN | 108801269 A | 11/2018 |
| CN | 109029417 A | 12/2018 |
| CN | 109540142 A | 3/2019 |
| CN | 111604916 | 9/2020 |
| CN | 211956515 | 11/2020 |
| CN | 112034861 | 12/2020 |
| CN | 113168184 A | 7/2021 |
| CN | 113633219 | 11/2021 |
| CN | 114174766 A | 3/2022 |
| CN | 114503043 A | 5/2022 |
| JP | H02127180 A | 5/1990 |
| JP | H09-134217 | 11/2003 |
| JP | 2005088189 A | 4/2005 |
| JP | 2006-011880 | 1/2006 |
| JP | 2006239844 A | 9/2006 |
| JP | 2007041656 A | 2/2007 |
| JP | 2008-072963 | 4/2008 |
| JP | 2009223628 A | 10/2009 |

(56) References Cited

FOREIGN PATENT DOCUMENTS

| | | |
|---|---|---|
| JP | 2009271513 A | 11/2009 |
| JP | 2010253585 A | 11/2010 |
| JP | 2013-250795 | 12/2013 |
| JP | 2014-123200 | 7/2014 |
| JP | 2014151370 A | 8/2014 |
| JP | 2016-081404 | 5/2016 |
| JP | 2016-103158 | 6/2016 |
| JP | 2017182502 A | 10/2017 |
| JP | 2019500691 A | 1/2019 |
| JP | 2019021197 A | 2/2019 |
| JP | 2022504039 A | 1/2022 |
| JP | 2022543997 A | 10/2022 |
| JP | 7219812 B2 | 2/2023 |
| JP | 7259020 B2 | 4/2023 |
| KR | 10-1121763 | 3/2012 |
| KR | 20120019893 A | 3/2012 |
| KR | 20130020107 A | 2/2013 |
| KR | 20220078563 A | 6/2022 |
| KR | 20220083666 A | 6/2022 |
| KR | 102492242 B1 | 1/2023 |
| KR | 102504729 B1 | 3/2023 |
| KR | 20230035139 A | 3/2023 |
| KR | 102533690 B1 | 5/2023 |
| WO | WO 2007/051972 | 5/2007 |
| WO | WO2017/090108 | 6/2017 |
| WO | WO 2018/231616 A1 | 12/2018 |
| WO | WO 2020/076418 A1 | 4/2020 |
| WO | WO 2020/076422 | 4/2020 |
| WO | WO 2021/025707 | 2/2021 |
| WO | WO 2021/025708 A1 | 2/2021 |
| WO | WO 2022/164832 A1 | 8/2022 |
| WO | WO 2022/256811 | 12/2022 |
| WO | WO 2022/256815 | 12/2022 |
| WO | WO 2022/256821 | 12/2022 |
| WO | WO 2023/249979 A1 | 12/2023 |
| WO | WO 2024/220811 A2 | 10/2024 |

OTHER PUBLICATIONS

Alkautsar, "Topological Path Planning and Metric Path Planning", https://medium.com/@arifmaulanaa/topological-path-planning-and-metric-path-planning-5c0fa7f107f2, downloaded Feb. 13, 2023, 3 pages.
boost.org, "buffer (with strategies)", https://www.boost.org/doc/libs/1_75_0/libs/geometry/doc/html/geometry/reference/algorithms/buffer/buffer_7_with_strategies.html, downloaded Feb. 1, 2023, 5 pages.
Buchegger et al. "An Autonomous Vehicle for Parcel Delivery in Urban Areas" 2018 21st International Conference on Intelligent Transportation Systems (ITSC), Nov. 2018, DOI: 10.1109/ITSC.2018.8569339, pp. 2961-2967.
Cao, "Topological Path Planning for Crowd Navigation", https://www.ri.cmu.edu/app/uploads/2019/05/thesis.pdf, May 2019, 24 pages.
Collins et al. "Efficient Planning for High-Speed MAV Flight in Unknown Environments Using Online Sparse Topological Graphs" IEEE International Conference on Robotics and Automation (ICRA), Aug. 2020, DOI: 10.1109/ICRA40945.2020.9197167, pp. 11450-11456.
github.com, "cartographer-project/cartographer", https://github.com/cartographer-project/cartographer, downloaded Feb. 1, 2023, 4 pages.
International Search Report and Written Opinion for PCT Application No. PCT/US2019/047804 mailed Apr. 6, 2020 in 14 pages.
International Search Report and Written Opinion for PCT Application No. PCT/US2019/051092, Apr. 30, 2020, 12 pages.
International Search Report and Written Opinion for PCT Application No. PCT/US2022/072710 Sep. 27, 2022, 16 pages.
International Search Report and Written Opinion for PCT Application No. PCT/US2022/072703, Sep. 22, 2022, 13 pages.
International Search Report and Written Opinion for PCT Application No. PCT/US2022/072717, Sep. 30, 2022, 26 pages.
Kuipers et al. "A Robot Exploration and Mapping Strategy Based on a Semantic Hierarchy of Spatial Representations" Journal of Robotics & Autonomous Systems vol. 8, 1991, DOI:10.1016/0921-8890(91)90014-C, pp. 47-63.
McCammon et al., "Topological path planning for autonomous information gathering", Auton. Robot 45, (2021), https://doi.org/10.1007/s10514-021-10012-x, pp. 821-842.
Leon et al., "TIGRE: Topological Graph based Robotic Exploration", 2017 European Conference on Mobile Robots (ECMR), Paris, France, 2017, doi: 10.1109/ECMR.2017.8098718. pages 1-6.
Mendes et al., "ICP-based pose-graph SLAM", International Symposium on Safety, Security and Rescue Robotics (SSRR), Oct. 2016, Lausanne, Switzerland, ff10.1109/SSRR.2016.7784298, hal-01522248, pp. 195-200.
Poncela et al., "Efficient integration of metric and topological maps for directed exploration of unknown environments", Robotics and Autonomous Systems, vol. 41, No. 1, Oct. 31, 2002, https://doi.org/10.1016/S0921-8890(02)00272-5, p. 21-39.
Tang, "Introduction to Robotics", The Wayback Machine, https://web.archive.org/web/20160520085742/http://www.cpp.edu:80/~ftang/courses/CS521/, downloaded Feb. 3, 2023, 58 pages.
Thrun et al., "The GraphSLAM Algorithm with Applications to Large-Scale Mapping of Urban Structures", The International Journal of Robotics Research, vol. 25, No. 5-6, May-Jun. 2006, DOI:10.1177/0278364906065387, pp. 403-4290.
Video game, "Unreal Engine 5", https://docs.unrealengine.com/5.0/en-US/basic-navigation-in-unreal-engine/, downloaded Feb. 1, 2023, 15 pages.
Whelan et al, "ElasticFusion: Dense SLAM Without a Pose Graph", http://www.roboticsproceedings.org/rss11/p01.pdf, downloaded Feb. 1, 2023, 9 pages.
wilipedia.org, "Buffer (GIS)", http://wiki.gis.com/wiki/index.php/Buffer_(GIS)#:~:text=A%20'polygon%20buffer'%20is%20a,Buffer%20around%20line%20features, downloaded Feb. 1, 2023, 4 pages.
wikipedia.org, "Probabilistic roadmap", https://en.wikipedia.org/wiki/Probabilistic_roadmap, downloaded Feb. 1, 2023, 2 pages.
wikipedia.org, "Rapidly-exploring random tree", https://en.wikipedia.org/wiki/Rapidly-exploring_random_tree, downloaded Feb. 1, 2023, 7 pages.
wikipedia.org, "Visibility graph", https://en.wikipedia.org/wiki/Visibility_graph, downloaded Feb. 1, 2023, 3 pages.
Yamauchi et al. "Place Recognition in Dynamic Environments" Journal of Robotic Systems, Special Issue on Mobile Robots, vol. 14, No. 2, Feb. 1997, https://doi.org/10.1002/(SICI)1097-4563(199702)14:2<107::AID-ROB5>3.0.CO;2-W, pp. 107-120.
Yamauchi et al. "Spatial Learning for Navigation in Dynamic Environments" IEEE Transactions on Systems, Man, and Cybernetics—Part B: Cybernetics, Special Issue on Learning Autonomous Robots, vol. 26, No. 3, Jun. 1996, DOI: 10.1109/3477.499799, pp. 496-505.
Boston Dynamics, "Hey Buddy, Can You Give Me a Hand?," https://www.youtube.com/watch?v=fUyU3IKzoio, Feb. 12, 2018, downloaded Jul. 31, 2023.
Boston Dynamics, "Introducing Spot Classic (previously Spot)," https://www.youtube.com/watch?v=M8YjvHYbZ9w, Feb. 9, 2015, downloaded Aug. 10, 2023.
Boston Dynamics, "Introducing Spot (Previously SpotMini)," https://www.youtube.com/watch?v=tf7IEVTDjng, Jun. 23, 2016, downloaded Jul. 31, 2023.
Boston Dynamics, "Spot Autonomous Navigation," https://www.youtube.com/watch?v=Ve9kWX_KXus, May 10, 2018, downloaded Sep. 5, 2023.
Boston Dynamics, "Spot Robot Testing at Construction Sites," https://www.youtube.com/watch?v=wND9goxDVrY&t=15s, Oct. 11, 2018, downloaded Sep. 5, 2023.
Boston Dynamics, "SpotMini", The Wayback Machine, http://web.archive.org/web/20171118145237/https://bostondynamics.com/spot-mini, downloaded Jul. 31, 2023, 3 pages.
Boston Dynamics, "Testing Robustness," https://www.youtube.com/watch?v=aFuA50H9uek, Feb. 20, 2018, downloaded Jul. 31, 2023.
Boston Dynamics, "The New Spot," https://www.youtube.com/watch?v=kgaO45SyaO4, Nov. 13, 2017, downloaded Jul. 31, 2023.
Lee et al., "A New Semantic Descriptor for Data Association in Semantic SLAM", 2019 109th International Conference on Control, Automation and Systems (ICCAS), Jeju, Korea (South), Oct. 15, 2019; pp. 1178-1181, IEEE.
International Search Report and Written Opinion for PCT Application No. PCT/US2023/025806, Oct. 11, 2023, 16 pages.

(56) References Cited

OTHER PUBLICATIONS

Liu et al., "Behavior-based navigation system of mobile robot in unknown environment", Industrial Control Comp. Dec. 25, 2017; 12: 28-30.
Song et al., "Environment model based path planning for mobile robot", Electronics Optics & Control, Jun. 30, 2006, 3: 102-104.
Matsumaru T., Mobile robot with preliminary-announcement and display function of forthcoming motion using projection equipment. In Roman 2006—The 15th IEEE International Symposium on Robot and Human Interactive Communication Sep. 6, 2006 (pp. 443-450).
Wei et al., "A method of autonomous robot navigation in dynamic unknown environment", J Comp Res Devel. Sep. 30, 2005; 9: 1538-1543.
Wengefeld et al., "A laser projection system for robot intention communication and human robot interaction." In 2020 29th IEEE International Conference on Robot and Human Interactive Communication (RO-MAN) Aug. 3, 20201 (pp. 259-265).
Zhao et al., "Machine vision-based unstructured road navigation path detection method", Trans Chinese Soc Agricult Mach. Jun. 25, 2007; 6: 202-204. (English Abstract not available).
International Search Report and Written Opinion for PCT Application No. PCT/US2024/025417, Nov. 5, 2024, 26 pages.

\* cited by examiner

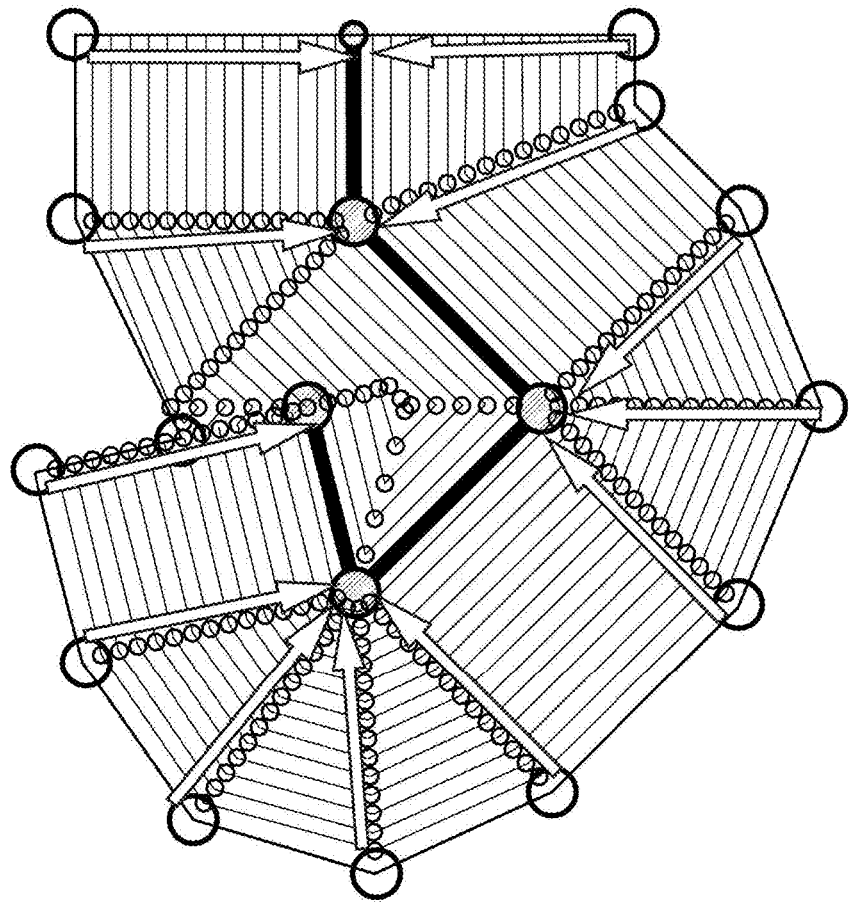

FIG. 7C

For each candidate spoke edge (green alternate waypoint and white arrow correspondence), check:

1) Does the straight-line path appear free?
   a) (and is the straight-line path fully within the sensing range/computed obstacle map)
   b) Shorten it/relocate the green waypoint if that would bring us out of collision
2) Does the LocalNav boundary constraint for this candidate edge overlap a lot with those of other candidate edges or input/original edges?

For each candidate rim edge (solid black arrow), check:
1) Does the straight-line path appear free?
   a) Allow parts of this check to be outside the sensing range/computed obstacle map (check if we have the info, otherwise assume it is traversable)
2) Does the LocalNav boundary constraint for this candidate edges or input/original edges?
3) Is the shortest path (dashed black arrow) between each end of the candidate rim edge less than some threshold?
   a) candidate rim edges where this check applies are shown with "?" question marks

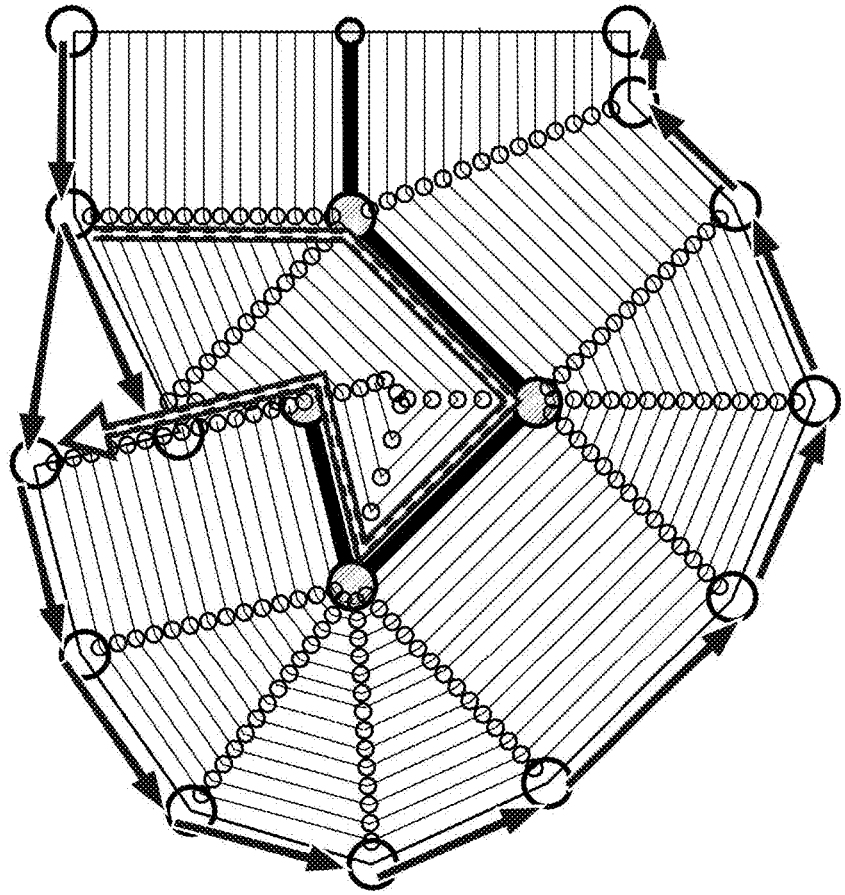

FIG. 7D

ALTERNATE ROUTE FINDING FOR WAYPOINT-BASED NAVIGATION MAPS

CROSS REFERENCE TO RELATED APPLICATIONS

This application claims priority under 35 U.S.C. § 119(e) to U.S. Provisional Application 63/202,288, filed on Jun. 4, 2021. The disclosure of this prior application is considered part of the disclosure of this application and is hereby incorporated by reference in its entirety.

TECHNICAL FIELD

This disclosure relates to alternate route finding for navigation maps.

BACKGROUND

Robotic devices navigate constrained environments to perform a variety of tasks or functions. To navigate through these constrained environments, the robotic devices may identify obstacles. Based on the identification of the obstacles, the robotic devices can navigate the constrained environment without contacting the obstacles.

SUMMARY

An aspect of the present disclosure provides a computer-implemented method that when executed by data processing hardware of a robot causes the data processing hardware to perform operations. The operations include obtaining a topological map including a series of route waypoints representative of a navigation route for the robot to follow from a start location to a destination location. The operations include receiving image data of an environment of the robot from an image sensor. The operations include determining, using the image data, that a route edge that connects a first route waypoint of the series of route waypoints to a second route waypoint of the series of route waypoints is at least partially blocked by an obstacle. The operations include generating, using the image data and the topological map, an alternate waypoint and an alternate edge connecting the alternate waypoint to the first route waypoint. The operations include adjusting the navigation route to include the alternate waypoint and the alternate edge, the alternate waypoint and the alternate edge bypassing the route edge that is at least partially blocked by the obstacle.

In some implementations, the operations include navigating the robot from the first route waypoint to the alternate waypoint by traversing the robot along the alternate edge connecting the alternate waypoint to the first route waypoint.

In some implementations, adjusting the navigation route includes obtaining a cost for each route edge of a series of route edges of the topological map and each alternate edge of one or more alternate edges and determining a route from a current location of the robot to the destination location using one or more route edges and/or alternate edges with an aggregate cost less than a cost threshold value. In some embodiments, route edges that are not at least partially blocked by one or more obstacles may have a cost less than a cost of alternate edges. In other embodiments, route edges that are at least partially blocked by one or more obstacles may have a cost greater than or equal to the cost of alternate edges. In some examples, the alternate waypoint is offset from at least one route waypoint of the series of route waypoints by an offset distance. The offset distance may be less than or equal to an operational range of the image sensor.

In some implementations, the operations further include generating a second alternate edge connecting the alternate waypoint and a second alternate waypoint. In some examples, the operations further include, determining that the second alternate edge connecting the alternate waypoint and the second alternate waypoint is blocked, and readjusting the navigation route to include a third alternate waypoint. The readjusted navigation route may bypass the second alternate edge.

In some embodiments, generating the alternate waypoint includes using a polyline buffer algorithm to generate the alternate waypoint. In some examples, generating the alternate waypoint includes generating one or more alternate waypoints within a threshold distance of a current location of the robot.

In some implementations, the topological map indicates one or more locations of one or more static obstacles within the environment. In some cases, the topological map indicates a location of the alternate waypoint is free from static obstacles.

In some examples, generating the alternate waypoint includes generating at least two alternate waypoints, and the at least two alternate waypoints are connected by a respective alternate edge.

Another aspect of the present disclosure provides a system. The system includes data processing hardware of a robot and memory hardware in communication with the data processing hardware. The memory hardware stores instructions that when executed on the data processing hardware cause the data processing hardware to perform operations. The operations include obtaining a topological map including a series of route waypoints representative of a navigation route for the robot to follow from a start location to a destination location. The operations include receiving image data of an environment of the robot from an image sensor. The operations include determining, using the image data, that a route edge that connects a first route waypoint of the series of route waypoints to a second route waypoint of the series of route waypoints is at least partially blocked by an obstacle. The operations include generating, using the image data and the topological map, an alternate waypoint and an alternate edge connecting the alternate waypoint to the first route waypoint. The operations include adjusting the navigation route to include the alternate waypoint and the alternate edge, the alternate waypoint and the alternate edge bypassing the route edge that is at least partially blocked by the obstacle.

In some implementations, the operations include navigating the robot from the first route waypoint to the alternate waypoint by traversing the robot along the alternate edge connecting the alternate waypoint to the first route waypoint.

In some implementations, adjusting the navigation route includes obtaining a cost for each route edge of a series of route edges of the topological map and each alternate edge of one or more alternate edges and determining a route from a current location of the robot to the destination location using one or more route edges and/or alternate edges with an aggregate cost less than a cost threshold value. In some embodiments, route edges that are not at least partially blocked by one or more obstacles may have a cost less than a cost of alternate edges. In other embodiments, route edges that are at least partially blocked by one or more obstacles may have a cost greater than or equal the cost of alternate edges. In some examples, the alternate waypoint is offset from at least one route waypoint of the series of route waypoints by an offset distance. The offset distance may be less than or equal to an operational range of the image sensor.

In some implementations, the operations further include generating a second alternate edge connecting the alternate waypoint and a second alternate waypoint. In some examples, the operations further include, determining that the second alternate edge connecting the alternate waypoint and the second alternate waypoint is blocked, and readjusting the navigation route to include a third alternate waypoint. The readjusted navigation route may bypass the second alternate edge.

In some embodiments, generating the alternate waypoint includes using a polyline buffer algorithm to generate the alternate waypoint. In some examples, generating the alternate waypoint includes generating one or more alternate waypoints within a threshold distance of a current location of the robot.

In some implementations, the topological map indicates one or more locations of one or more static obstacles within the environment. In some cases, the topological map indicates a location of the alternate waypoint is free from static obstacles.

In some examples, generating the alternate waypoint includes generating at least two alternate waypoints, and the at least two alternate waypoints are connected by a respective alternate edge.

Yet another aspect of the present disclosure provides a computer-implemented method that when executed by data processing hardware of a robot causes the data processing hardware to perform operations. The operations include obtaining a topological map including a series of route waypoints representative of a navigation route for the robot to follow from a start location to a destination location. The operations include receiving image data of an environment of the robot from an image sensor. The operations include determining, using the image data, that a route edge that connects a first route waypoint of the series of route waypoints to a second route waypoint of the series of route waypoints is at least partially blocked by an obstacle. The operations include generating, using the image data and the topological map, an alternate waypoint. The operations include adjusting the navigation route to include the alternate waypoint, the alternate waypoint bypassing the route edge that is at least partially blocked by the obstacle.

In some implementations, each route edge of a series of route edges of the topological map connects a corresponding pair of route waypoints of the series of route waypoints. In some embodiments, one or more of the above steps occurs as the robot navigates along the navigation route. In some examples, an alternate edge is generated connecting the alternate waypoint to the first route waypoint. In some implementations, the operations include navigating the robot. Navigating the robot may include traversing the robot along the alternate edge.

An additional aspect of the present disclosure provides a system. The system includes data processing hardware of a robot and memory hardware in communication with the data processing hardware. The memory hardware stores instructions that when executed on the data processing hardware cause the data processing hardware to perform operations. The operations include obtaining a topological map including a series of route waypoints representative of a navigation route for the robot to follow from a start location to a destination location. The operations include receiving image data of an environment of the robot from an image sensor. The operations include determining, using the image data, that a route edge that connects a first route waypoint of the series of route waypoints to a second route waypoint of the series of route waypoints is at least partially blocked by an obstacle. The operations include generating, using the image data and the topological map, an alternate waypoint. The operations include adjusting the navigation route to include the alternate waypoint, the alternate waypoint bypassing the route edge that is at least partially blocked by the obstacle.

In some implementations, each route edge of a series of route edges of the topological map connects a corresponding pair of route waypoints of the series of route waypoints. In some embodiments, one or more of the above steps occurs as the robot navigates along the navigation route. In some examples, an alternate edge is generated connecting the alternate waypoint to the first route waypoint. In some implementations, the operations include navigating the robot. Navigating the robot may include traversing the robot along the alternate edge.

The details of the one or more implementations of the disclosure are set forth in the accompanying drawings and the description below. Other aspects, features, and advantages will be apparent from the description and drawings, and from the claims.

DESCRIPTION OF DRAWINGS

FIG. 7C is a schematic view of generating alternate waypoints and alternate edges using a polyline buffer algorithm.
FIG. 7D is a schematic view of generating alternate waypoints and alternate edges using a polyline buffer algorithm.

Like reference symbols in the various drawings indicate like elements.

DETAILED DESCRIPTION

Autonomous and semi-autonomous robots may be equipped with complex mapping, localization, and navigation systems. These systems may utilize navigation graphs. The navigation graph may include an obstacle map for local navigation. However, the obstacle map for local navigation may be limited in size, complexity, the information provided by the obstacle map, etc. For example, the obstacle map may be limited based on a sensing range threshold (e.g., a sensing range threshold of the robot) and/or to increase efficiency, reduce computational cost, etc. Further, the obstacle map may be limited to limit the robot to exploring a particular known safe area around a recorded path of the obstacle map and/or to prevent oscillating interactions by the robot with the obstacle map. Therefore, the obstacle map may lead to the robot becoming "stuck" on obstacles due to the obstacle map.

Implementations herein are directed toward systems and methods for navigating a robot with additional flexibility for exploration in a verifiably-safe manner. The navigation system enables a robot to reroute (e.g., deterministically) around a plurality of classes of obstacles using an automated post-processing algorithm that adds graph structure in particular areas (e.g., areas where a predicted traversability of the area exceeds or matches a traversability threshold and/or areas where an observed portion of the area exceeds or matches an observed threshold). The robot may identify one or more additional paths based on the added graph structure that the robot may take to avoid a blockage within the nominal path. After avoiding the blockage, the robot may return to the nominal path. Therefore, the robot can gain additional navigation flexibility during runtime using the added graph structure in a deterministic manner and the added graph structure can be tuned and verified offline.

Figure 1A:
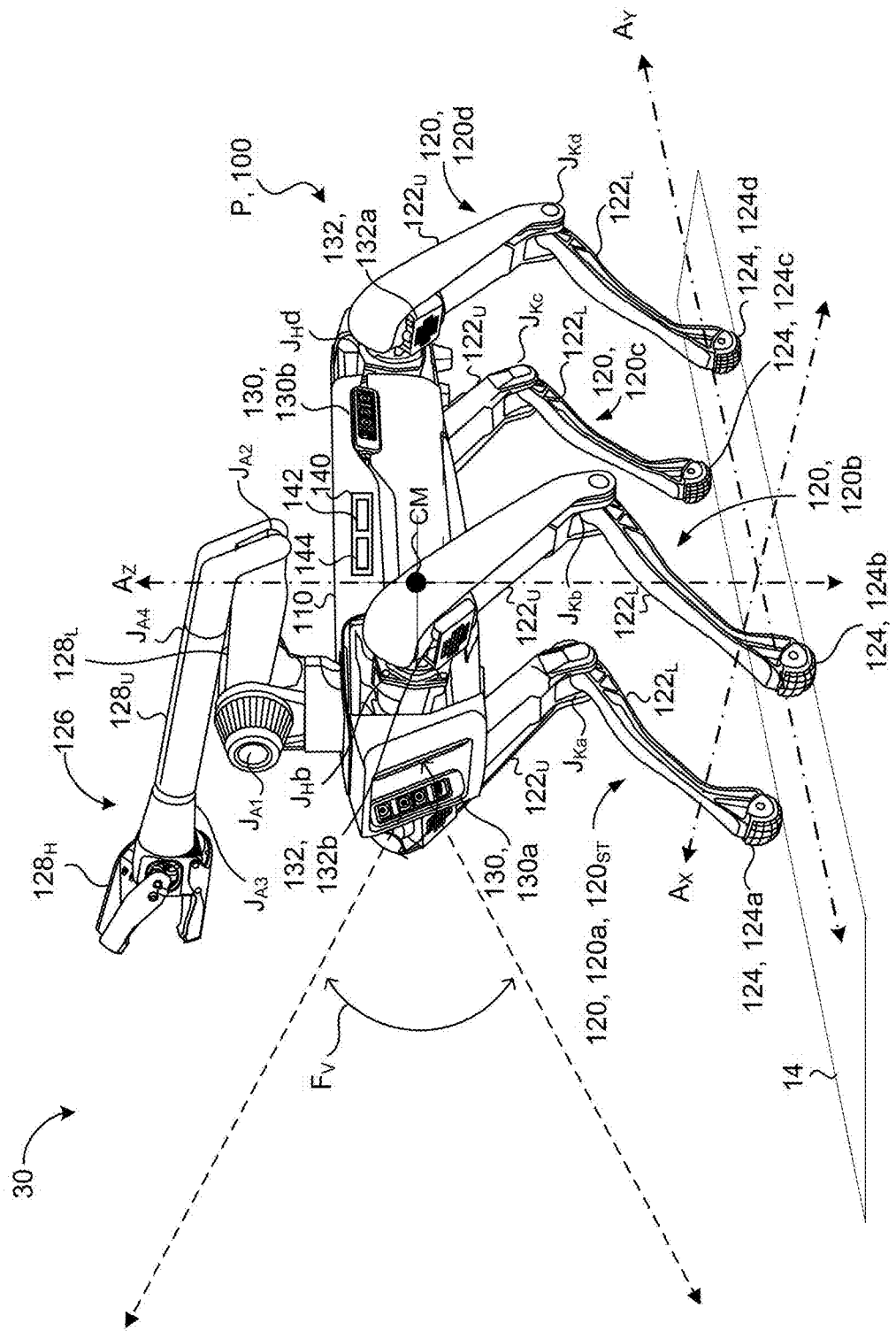
FIG. 1A is a schematic view of an example robot for navigating about an environment.
Figure 1B:
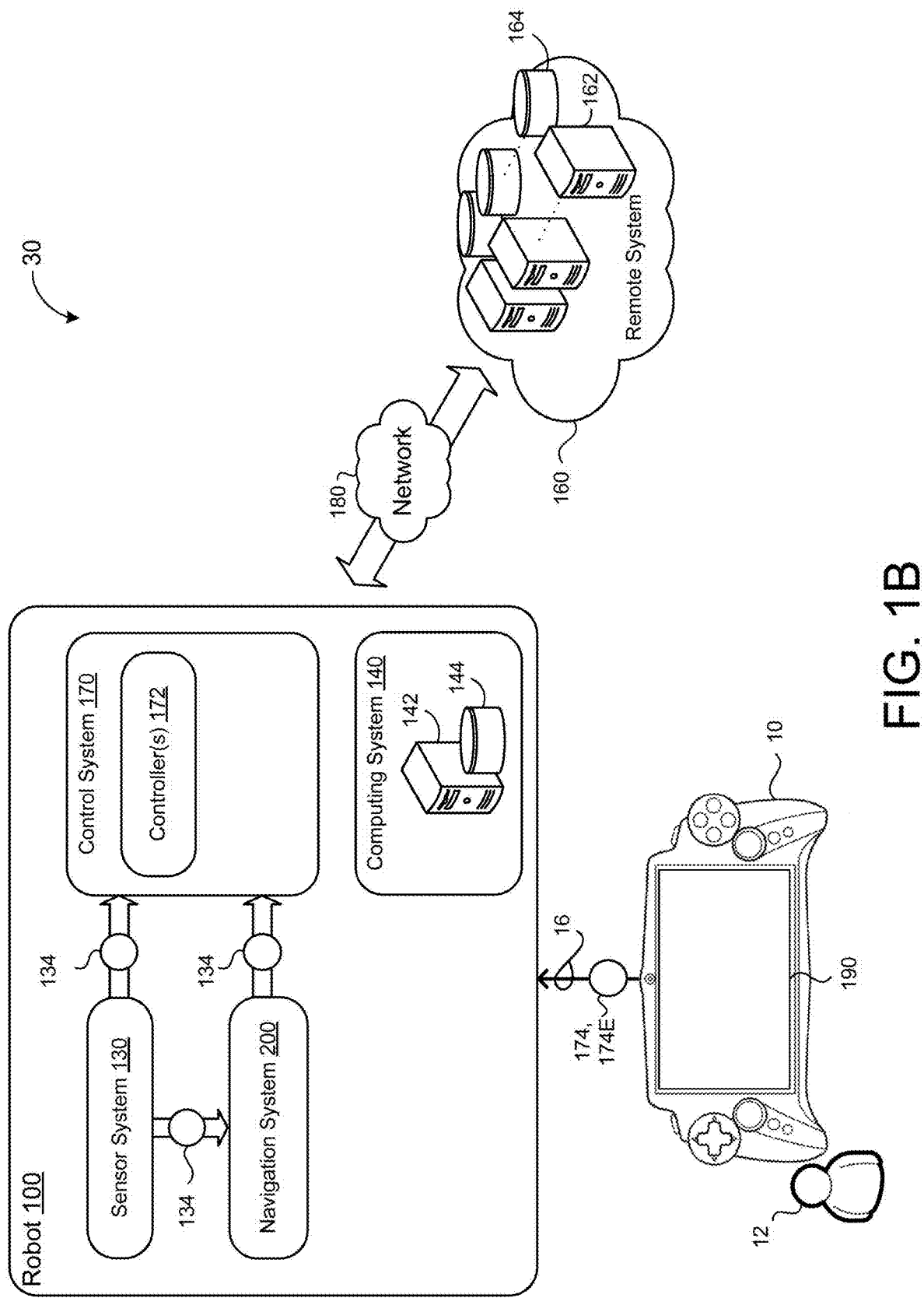
FIG. 1B is a schematic view of a navigation system for navigating the robot of FIG. 1A.

Referring to FIGS. 1A and 1B, in some implementations, a robot 100 includes a body 110 with one or more locomotion-based structures such as legs 120a-d coupled to the body 110 that enable the robot 100 to move within an environment 30 that surrounds the robot 100. In some examples, all or a portion of the legs 120 are an articulable structure such that one or more joints J permit members 122 of the leg 120 to move. For instance, in the illustrated embodiment, all or a portion of the legs 120 include a hip joint $J_H$ coupling an upper member 122, 122U of the leg 120 to the body 110 and a knee joint $J_K$ coupling the upper member 122U of the leg 120 to a lower member 122L of the leg 120. Although FIG. 1A depicts a quadruped robot with four legs 120a-d, the robot 100 may include any number of legs or locomotive based structures (e.g., a biped or humanoid robot with two legs, or other arrangements of one or more legs) that provide a means to traverse the terrain within the environment 30.

In order to traverse the terrain, all or a portion of the legs 120 may have a distal end 124 that contacts a surface of the terrain (e.g., a traction surface). Further, the distal end 124 of the leg 120 may be the end of the leg 120 used by the robot 100 to pivot, plant, or generally provide traction during movement of the robot 100. For example, the distal end 124 of a leg 120 corresponds to a foot of the robot 100. In some examples, though not shown, the distal end of the leg includes an ankle joint such that the distal end is articulable with respect to the lower member of the leg.

In the examples shown, the robot 100 includes an arm 126 that functions as a robotic manipulator. The arm 126 may move about multiple degrees of freedom in order to engage elements of the environment 30 (e.g., objects within the environment 30). In some examples, the arm 126 includes one or more members 128, where the members 128 are coupled by joints J such that the arm 126 may pivot or rotate about the joint(s) J. For instance, with more than one member 128, the arm 126 may extend or to retract. To illustrate an example, FIG. 1 depicts the arm 126 with three members 128 corresponding to a lower member $128_L$, an upper member $128_U$, and a hand member $128_H$ (also referred to as an end-effector). Here, the lower member $128_L$ may rotate or pivot about a first arm joint $J_{A1}$ located adjacent to the body 110 (e.g., where the arm 126 connects to the body 110 of the robot 100). The lower member $128_L$ is coupled to the upper member $128_U$ at a second arm joint $J_{A2}$ and the upper member $128_U$ is coupled to the hand member $128_H$ at a third arm joint $J_{A3}$. In some examples, such as FIG. 1A, the hand member $128_H$ is a mechanical gripper that includes a moveable jaw and a fixed jaw that perform different types of grasping of elements within the environment 30. In the example shown, the hand member $128_H$ includes a fixed first jaw and a moveable second jaw that grasps objects by clamping the object between the jaws. The moveable jaw can move relative to the fixed jaw to move between an open position for the gripper and a closed position for the gripper (e.g., closed around an object). In some implementations, the arm 126 additionally includes a fourth joint $J_{A4}$. The fourth joint $J_{A4}$ may be located near the coupling of the lower member $128_L$ to the upper member $128_U$ and function to allow the upper member $128_U$ to twist or rotate relative to the lower member $128_L$. Therefore, the fourth joint $J_{A4}$ may function as a twist joint similarly to the third joint $J_{A3}$ or wrist joint of the arm 126 adjacent the hand member $128_H$. For instance, as a twist joint, one member coupled at the joint J may move or rotate relative to another member coupled at the joint J (e.g., a first member coupled at the twist joint is fixed while the second member coupled at the twist joint rotates). In some implementations, the arm 126 connects to the robot 100 at a socket on the body 110 of the robot 100. In some configurations, the socket is configured as a connector such that the arm 126 attaches or detaches from the robot 100 depending on whether the arm 126 is desired for particular operations.

The robot 100 has a vertical gravitational axis (e.g., shown as a Z-direction axis $A_Z$) along a direction of gravity, and a center of mass CM, which is a position that corresponds to an average position of all parts of the robot 100 where the parts are weighted according to their masses (e.g., a point where the weighted relative position of the distributed mass of the robot 100 sums to zero). The robot 100 further has a pose P based on the CM relative to the vertical gravitational axis $A_Z$ (e.g., the fixed reference frame with respect to gravity) to define a particular attitude or stance assumed by the robot 100. The attitude of the robot 100 can be defined by an orientation or an angular position of the robot 100 in space. Movement by the legs 120 relative to the body 110 alters the pose P of the robot 100 (e.g., the combination of the position of the CM of the robot and the attitude or orientation of the robot 100). Here, a height generally refers to a distance along the z-direction (e.g., along a z-direction axis $A_Z$). The sagittal plane of the robot 100 corresponds to the Y-Z plane extending in directions of a y-direction axis $A_Y$ and the z-direction axis $A_Z$. Therefore, the sagittal plane bisects the robot 100 into a left and a right side. Generally perpendicular to the sagittal plane, a ground plane (also referred to as a transverse plane) spans the X-Y plane by extending in directions of the x-direction axis $A_X$ and the y-direction axis $A_Y$. The ground plane refers to a ground surface 14 where distal ends 124 of the legs 120 of the robot 100 may generate traction to help the robot 100 move within the environment 30. Another anatomical plane of the robot 100 is the frontal plane that extends across the body 110 of the robot 100 (e.g., from a right side of the robot 100 with a first leg 120*a* to a left side of the robot 100 with a second leg 120*b*). The frontal plane spans the X-Z plane by extending in directions of the x-direction axis $A_X$ and the z-direction axis $A_Z$.

In order to maneuver within the environment 30 or to perform tasks using the arm 126, the robot 100 includes a sensor system 130 (also referred to as a vision system) with one or more sensors 132, 132*a-n*. For example, FIG. 1A illustrates a first sensor 132, 132*a* mounted at a head of the robot 100 (e.g., near a front portion of the robot 100 adjacent the front legs 120*a-b*), a second sensor 132, 132*b* mounted near the hip of the second leg 120*b* of the robot 100, a third sensor 132, 132*c* corresponding to one of the sensors 132 mounted on a side of the body 110 of the robot 100, a fourth sensor 132, 132*d* mounted near the hip of the fourth leg 120*d* of the robot 100, and a fifth sensor 132, 132*e* mounted at or near the hand member 128$_H$ of the arm 126 of the robot 100. The sensors 132 may include vision/image sensors, inertial sensors (e.g., an inertial measurement unit (IMU)), force sensors, and/or kinematic sensors. For example, the sensors 132 may include one or more of an image sensor, (e.g., a camera, a stereo camera, etc.), a time-of-flight (TOF) sensor, a scanning light-detection and ranging (LIDAR) sensor, or a scanning laser-detection and ranging (LADAR) sensor. In some examples, the sensor 132 has a corresponding field(s) of view $F_V$ defining a sensing range or region corresponding to the sensor 132. For instance, FIG. 1A depicts a field of a view $F_V$ for the first sensor 132, 132*a* of the robot 100. Each sensor 132 may be pivotable and/or rotatable such that the sensor 132, for example, changes the field of view $F_V$ about one or more axis (e.g., an x-axis, a y-axis, or a z-axis in relation to a ground plane). In some examples, multiple sensors 132 may be clustered together (e.g., similar to the first sensor 132*a*) to stitch a larger field of view $F_V$ than any single sensor 132. With multiple sensors 132 placed about the robot 100, the sensor system 130 may have a 360 degree view or a nearly 360 degree view of the surroundings of the robot 100 about vertical or horizontal axes.

When surveying a field of view $F_V$ with a sensor 132 (see e.g., FIG. 1B), the sensor system 130 generates sensor data 134 (e.g., image data) corresponding to the field of view $F_V$. The sensor system 130 may generate the field of view $F_V$ with a sensor 132 mounted on or near the body 110 of the robot 100 (e.g., sensor(s) 132*a*, 132*b*). The sensor system may additionally and/or alternatively generate the field of view $F_V$ with a sensor 132 mounted at or near the hand member 128$_H$ of the arm 126 (e.g., sensor(s) 132*c*). The one or more sensors 132 capture the sensor data 134 that defines the three-dimensional point cloud for the area within the environment 30 of the robot 100. In some examples, the sensor data 134 is image data that corresponds to a three-dimensional volumetric point cloud generated by a three-dimensional volumetric image sensor 132. Additionally or alternatively, when the robot 100 is maneuvering within the environment 30, the sensor system 130 gathers pose data for the robot 100 that includes inertial measurement data (e.g., measured by an IMU). In some examples, the pose data includes kinematic data and/or orientation data about the robot 100, for instance, kinematic data and/or orientation data about joints J or other portions of a leg 120 or arm 126 of the robot 100. With the sensor data 134, various systems of the robot 100 may use the sensor data 134 to define a current state of the robot 100 (e.g., of the kinematics of the robot 100) and/or a current state of the environment 30 of the robot 100. Therefore, the sensor system 130 may communicate the sensor data 134 from one or more sensors 132 to any other system of the robot 100 in order to assist the functionality of that system.

In some implementations, the sensor system 130 includes sensor(s) 132 coupled to a joint J. Moreover, these sensors 132 may couple to a motor M that operates a joint J of the robot 100 (e.g., sensors 132). Here, these sensors 132 generate joint dynamics in the form of joint-based sensor data 134. Joint dynamics collected as joint-based sensor data 134 may include joint angles (e.g., an upper member 122$_U$ relative to a lower member 122$_L$ or hand member 126$_H$ relative to another member of the arm 126 or robot 100), joint speed joint angular velocity, joint angular acceleration, and/or forces experienced at a joint J (also referred to as joint forces). Joint-based sensor data generated by one or more sensors 132 may be raw sensor data, data that is further processed to form different types of joint dynamics, or some combination of both. For instance, a sensor 132 measures joint position (or a position of member(s) 122 or 128 coupled at a joint J) and systems of the robot 100 perform further processing to derive velocity and/or acceleration from the positional data. In other examples, a sensor 132 can measure velocity and/or acceleration directly.

With reference to FIG. 1B, as the sensor system 130 gathers sensor data 134, a computing system 140 stores, processes, and/or communicates the sensor data 134 to various systems of the robot 100 (e.g., the control system 170, a navigation system 200, and/or remote controller 10). In order to perform computing tasks related to the sensor data 134, the computing system 140 of the robot 100 includes data processing hardware 142 (e.g., a hardware processor) and memory hardware 144 (e.g., a memory circuit). The data processing hardware 142 can execute instructions stored in the memory hardware 144 to perform computing tasks related to activities (e.g., movement and/or movement based activities) for the robot 100. The computing system 140 may refer to one or more locations of data processing hardware 142 and/or memory hardware 144.

In some examples, the computing system 140 is a local system located on the robot 100. When located on the robot 100, the computing system 140 may be centralized (e.g., in a single location/area on the robot 100, for example, the body 110 of the robot 100), decentralized (e.g., located at various locations about the robot 100), or a hybrid combination of both (e.g., including centralized hardware and decentralized hardware). To illustrate some differences, a decentralized computing system 140 may allow processing to occur at an activity location (e.g., at a motor that moves a joint of a leg 120) while a centralized computing system 140 may allow for a central processing hub that communicates to systems located at various positions on the robot 100 (e.g., communicate to the motor that moves the joint of the leg 120).

Additionally or alternatively, the computing system 140 includes computing resources that are located remote from the robot 100. For instance, the computing system 140 communicates via a network 180 with a remote system 160 (e.g., a remote server or a cloud-based environment). Much like the computing system 140, the remote system 160 includes remote computing resources such as remote data processing hardware 162 and remote memory hardware 164. Sensor data 134 or other processed data (e.g., data processing locally by the computing system 140) may be stored in the remote system 160 and may be accessible to the computing system 140. In additional examples, the computing system 140 can utilize the remote resources 162, 164 as extensions of the computing resources 142, 144 such that resources of the computing system 140 reside on resources of the remote system 160. In some examples, the remote system 160, or at least a portion of the remote resources 162, 164 reside on a remote controller 10 in communication with the robot 100.

In some implementations, as shown in FIG. 1B, the robot 100 includes a control system 170. The control system 170 may communicate with systems of the robot 100, such as the at least one sensor system 130 and the navigation system 200. The control system 170 may perform operations and other functions using hardware 140. The control system 170 includes at least one controller 172 that can control the robot 100. For example, the controller 172 controls movement of the robot 100 to about the environment 30 based on input or feedback from the systems of the robot 100 (e.g., the sensor system 130 and/or the control system 170). In additional examples, the controller 172 controls movement between poses and/or behaviors of the robot 100. The at least one controller 172 may control movement of the arm 126 of the robot 100 in order for the arm 126 to perform various tasks using the hand member $128_H$. For instance, the at least one controller 172 may control the hand member $128_H$ (e.g., a gripper) to manipulate an object or element in the environment 30. For example, the controller 172 actuates the movable jaw in a direction towards the fixed jaw to close the gripper. In other examples, the controller 172 actuates the movable jaw in a direction away from the fixed jaw to close the gripper.

A given controller 172 of the control system 170 may control the robot 100 by controlling movement about one or more joints J of the robot 100. In some configurations, the given controller 172 includes software or firmware with programming logic that controls at least one joint J or a motor M which operates, or is coupled to, a joint J. A software application (a software resource) may refer to computer software that causes a computing device to perform a task. In some examples, a software application may be referred to as an "application," an "app," or a "program." For instance, the controller 172 may control an amount of force that is applied to a joint J (e.g., torque at a joint J). As programmable controllers 172, the number of joints J that a controller 172 controls is scalable and/or customizable for a particular control purpose. A controller 172 may control a single joint J (e.g., control a torque at a single joint J), multiple joints J, or actuation of one or more members 128 (e.g., actuation of the hand member $128_H$) of the robot 100. By controlling one or more joints J, actuators or motors M, the controller 172 may coordinate movement for all different parts of the robot 100 (e.g., the body 110, one or more legs 120, the arm 126). For example, to perform a behavior with some movements, a controller 172 may control movement of multiple parts of the robot 100 such as, for example, two legs 120a-b, four legs 120a-d, or two legs 120a-b combined with the arm 126. In some examples, the controller 172 is an object-based controller that is set up to perform a particular behavior or set of behaviors for interacting with an interactable object.

With continued reference to FIG. 1B, an operator 12 (also referred to herein as a user or a client) may interact with the robot 100 via the remote controller 10 that communicates with the robot 100 to perform actions. For example, the operator 12 transmits commands 174 to the robot 100 (executed via the control system 170) via a wireless communication network 16. Additionally, the robot 100 may communicate with the remote controller 10 to display an image on a user interface 190 (e.g., UI 190) of the remote controller 10. For example, the UI 190 can display the image that corresponds to a three-dimensional field of view $F_V$ of the one or more sensors 132. The image displayed on the UI 190 of the remote controller 10 may be a two-dimensional image that corresponds to the three-dimensional point cloud of sensor data 134 (e.g., field of view $F_V$) for the area within the environment 30 of the robot 100. That is, the image displayed on the UI 190 may be a two-dimensional image representation that corresponds to the three-dimensional field of view $F_V$ of the one or more sensors 132.

Figure 2:
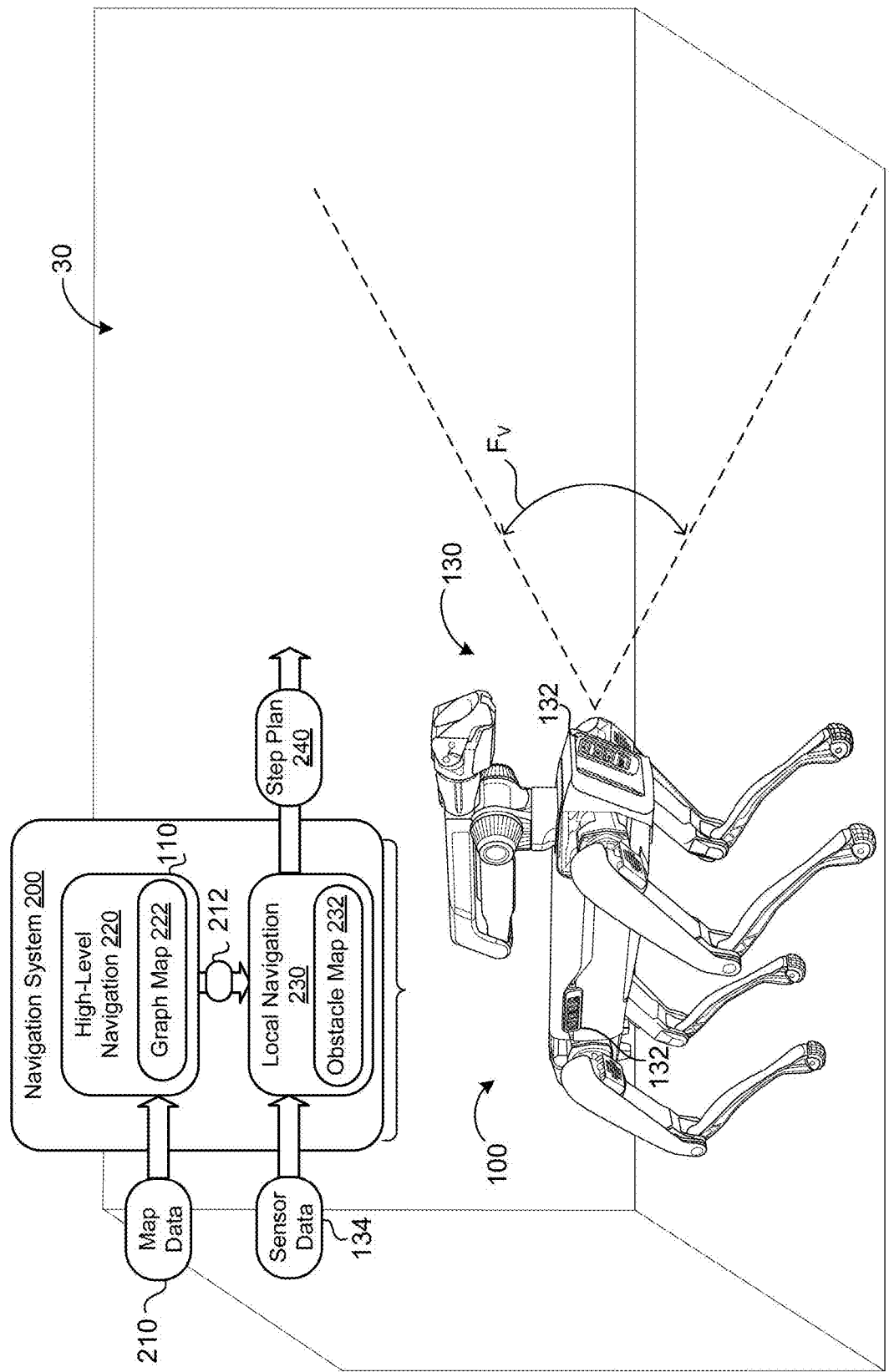
FIG. 2 is a schematic view of exemplary components of the navigation system.

Referring now to FIG. 2, the robot 100 (e.g., the data processing hardware 142) executes the navigation system 200 for enabling the robot 100 to navigate the environment 30. The sensor system 130 includes one or more imaging sensors 132 (e.g., image sensors, LIDAR sensors, LADAR sensors, etc.) that can each capture sensor data 134 of the environment 30 surrounding the robot 100 within the field of view $F_V$. For example, the one or more sensors 132 may be one or more cameras. The sensor system 130 may move the field of view $F_V$ by adjusting an angle of view or by panning and/or tilting (either independently or via the robot 100) one or more sensors 132 to move the field of view $F_V$ in any direction. In some implementations, the sensor system 130 includes multiple sensors 132 (e.g., multiple cameras) such that the sensor system 130 captures a generally 360-degree field of view around the robot 100.

Figure 3A:
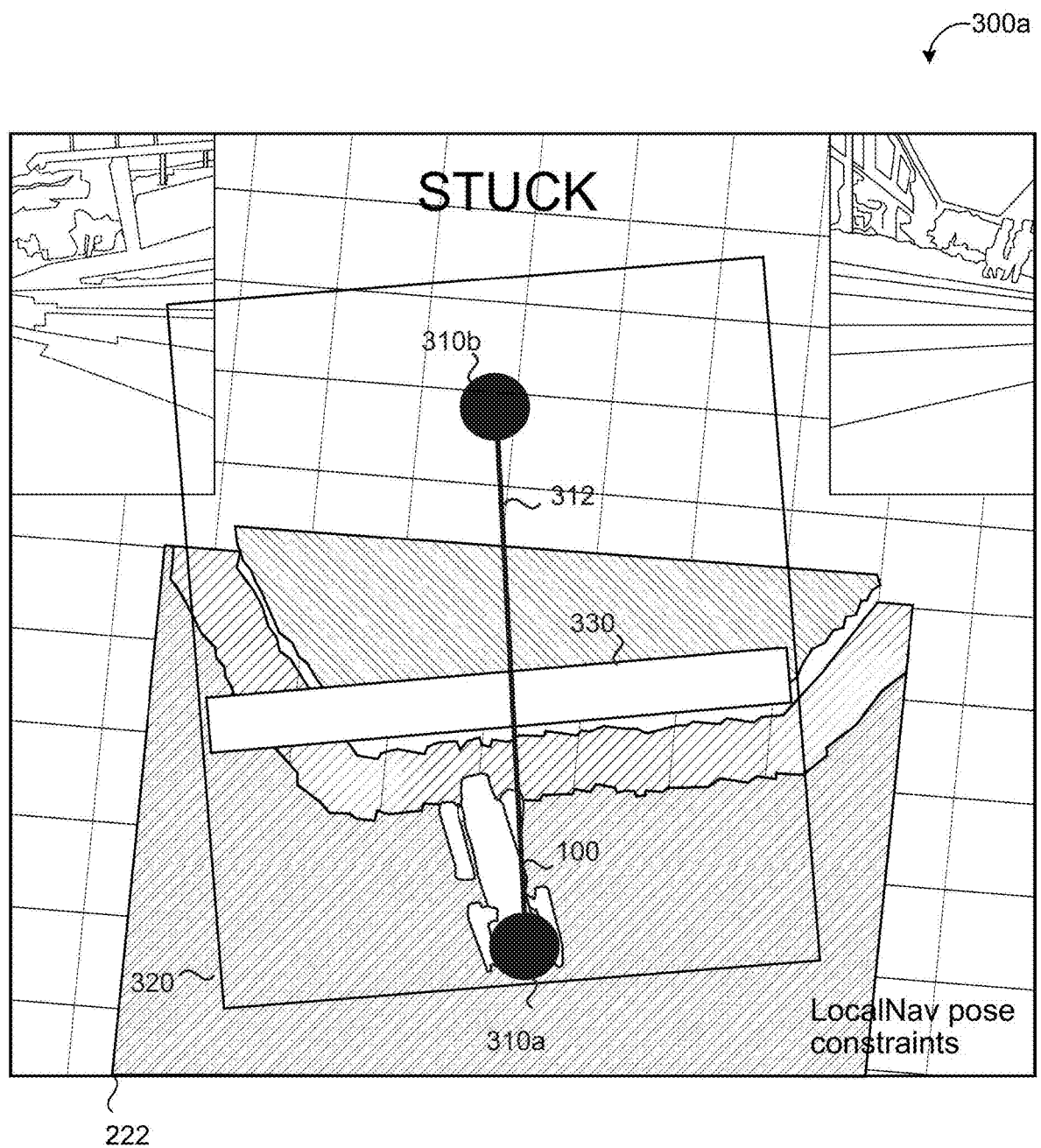
FIG. 3A is a schematic view of a robot encountering an obstacle
Figure 3B:
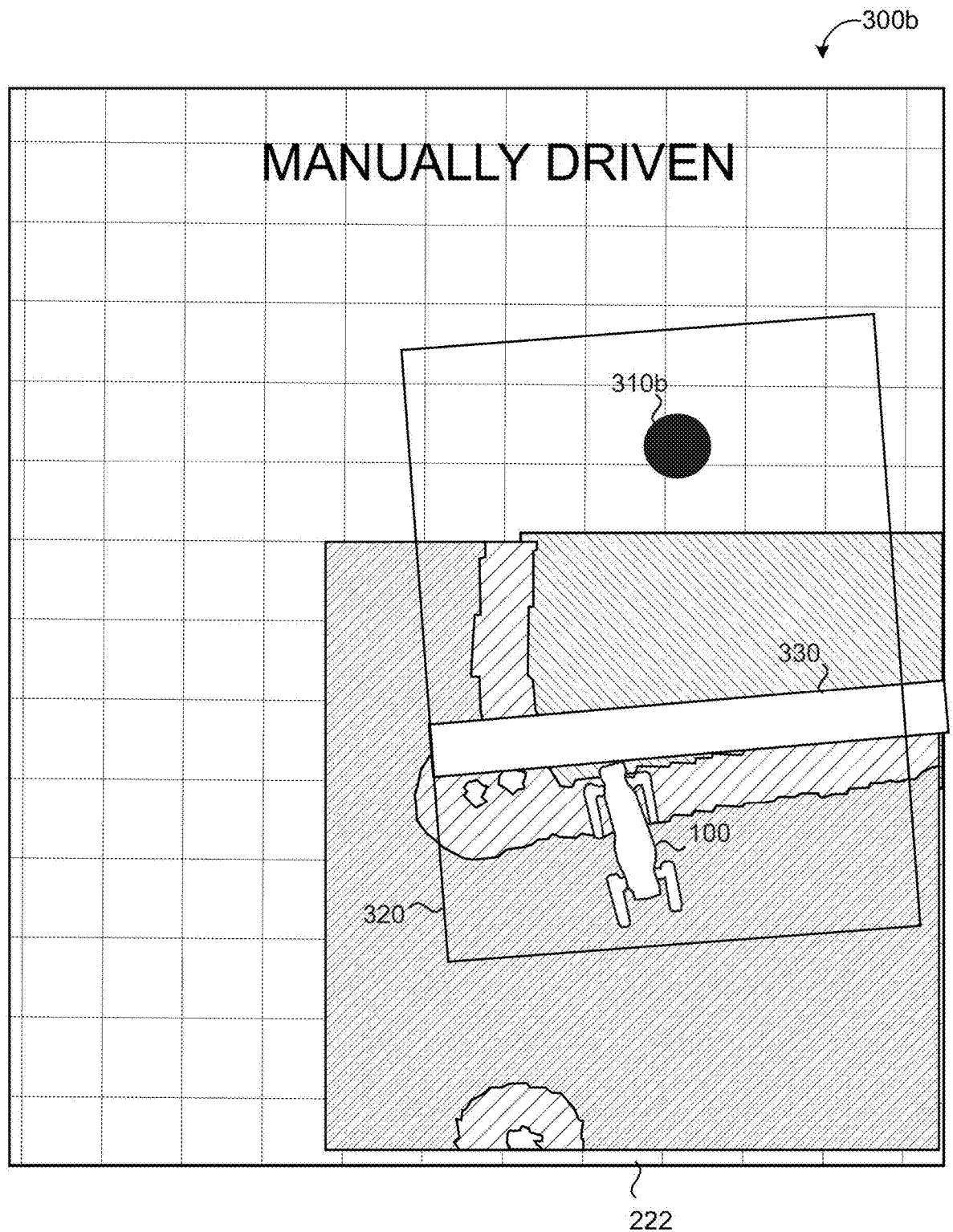
FIG. 3B is a schematic view of a robot encountering an obstacle

In the example of FIG. 2, the navigation system 200 includes a high-level navigation module 220 that receives map data 210 (e.g., high-level navigation data representative of locations of static obstacles in an area the robot 100 is to navigate). In some cases, the map data 210 includes a graph map 222. In other cases, the high-level navigation module 220 generates the graph map 222. The graph map 222 may include a topological map of a given area the robot 100 is to traverse. The high-level navigation module 220 can obtain (e.g., from the remote system 160 or the remote controller 10) and/or generate a series of route waypoints 310a, 310b (as shown in FIGS. 3A and 3B) on the graph map 222 for a navigation route 212 that plots a path around large and/or static obstacles from a start location (e.g., the current location of the robot 100) to a destination. Route edges may connect corresponding pairs of adjacent route waypoints. In some examples, the route edges record geometric transforms between route waypoints based on odometry data. The route waypoints and the route edges may be representative of the navigation route 212 for the robot 100 to follow from a start location to a destination location.

In some examples, the high-level navigation module 220 produces the navigation route 212 over a greater than 10 meter scale (e.g., the navigation route 212 may include distances greater than 10 meters from the robot 100). The navigation system 200 also includes a local navigation module 230 that can receive the navigation route 212 and the image or sensor data 134 from the sensor system 130. The local navigation module 230, using the sensor data 134, can generate an obstacle map 232. The obstacle map 232 may be a robot-centered map that maps obstacles (static and/or dynamic obstacles) in the vicinity (e.g., within a threshold distance) of the robot 100 based on the sensor data 134. For example, while the graph map 222 may include information relating to the locations of walls of a hallway, the obstacle map 232 (populated by the sensor data 134 as the robot 100 traverses the environment 30) may include information regarding a stack of boxes placed in the hallway that were not present during the original recording. The size of the obstacle map 232 may be dependent upon both the operational range of the sensors 132 (e.g., a camera, LIDAR, etc.) and the available computational resources.

The local navigation module 230 can generate a step plan 240 (e.g., using an A* search algorithm) that plots all or a portion of the individual steps (or other movement) of the robot 100 to navigate from the current location of the robot 100 to the next waypoint along the navigation route 212. Using the step plan 240, the robot 100 can maneuver through the environment 30. The local navigation module 230 may obtain a path for the robot 100 to the next waypoint using an obstacle grid map based on the captured sensor data 134. In some examples, the local navigation module 230 operates on a range correlated with the operational range of the sensor 132 (e.g., four meters) that is generally less than the scale of high-level navigation module 220.

Referring now to FIGS. 3A and 3B, in some examples, the navigation system imposes one or more constraints on the robot 100 as the robot 100 attempts to traverse a navigation route. For example, the robot 100 may be constrained from deviating more than a threshold distance from the navigation route and/or route waypoints 310a, b or route edges 312 that make up the navigation route. When the obstacle map is smaller than a particular threshold value (e.g., to reduce computational cost or due to sensor range), the navigation system may impose constraints to limit the robot's exploration during navigation to known safe areas near the navigation route and to, for example, prevent oscillating interactions with the small obstacle map size. However, these constraints can limit the robot's ability to navigate around obstacles that impede or block the navigation route.

A schematic view 300a illustrates a location of the robot 100 on the graph map 222. The local navigation module of the robot may impose a boundary constraint 320 on exploration of the robot 100 as the robot attempts to navigate from a first route waypoint 310a to a second route waypoint 310b along an edge 312. The size and location of the boundary constraint 320 may be based on the location of the route waypoints 310a, b, the sensor range of the robot's sensors, the computational resources of the robot 100, and/or the size and quality of the graph map 222. In the example of FIG. 3A, the robot 100, while navigating toward the waypoint 310b, encounters an obstacle 330. As shown in FIG. 3A, the obstacle 330 extends from the left side of the boundary box 320 to the right side of the boundary box 320. The robot may become stuck based on the position of the obstacle 330. For example, because the robot 100 cannot see a path around the obstacle 330 without violating the constraint imposed by the bounding constraint 320, the robot may become stuck. Referring now to FIG. 3B, a schematic view 300b illustrates that, in this example, that, after manually driving the robot 100 to the left, there is ample room to bypass the obstacle 330. However, due to constraints (e.g., the boundary constraint 320), the robot 100 may be unable to bypass the obstacle 330 autonomously.

Figure 4A:
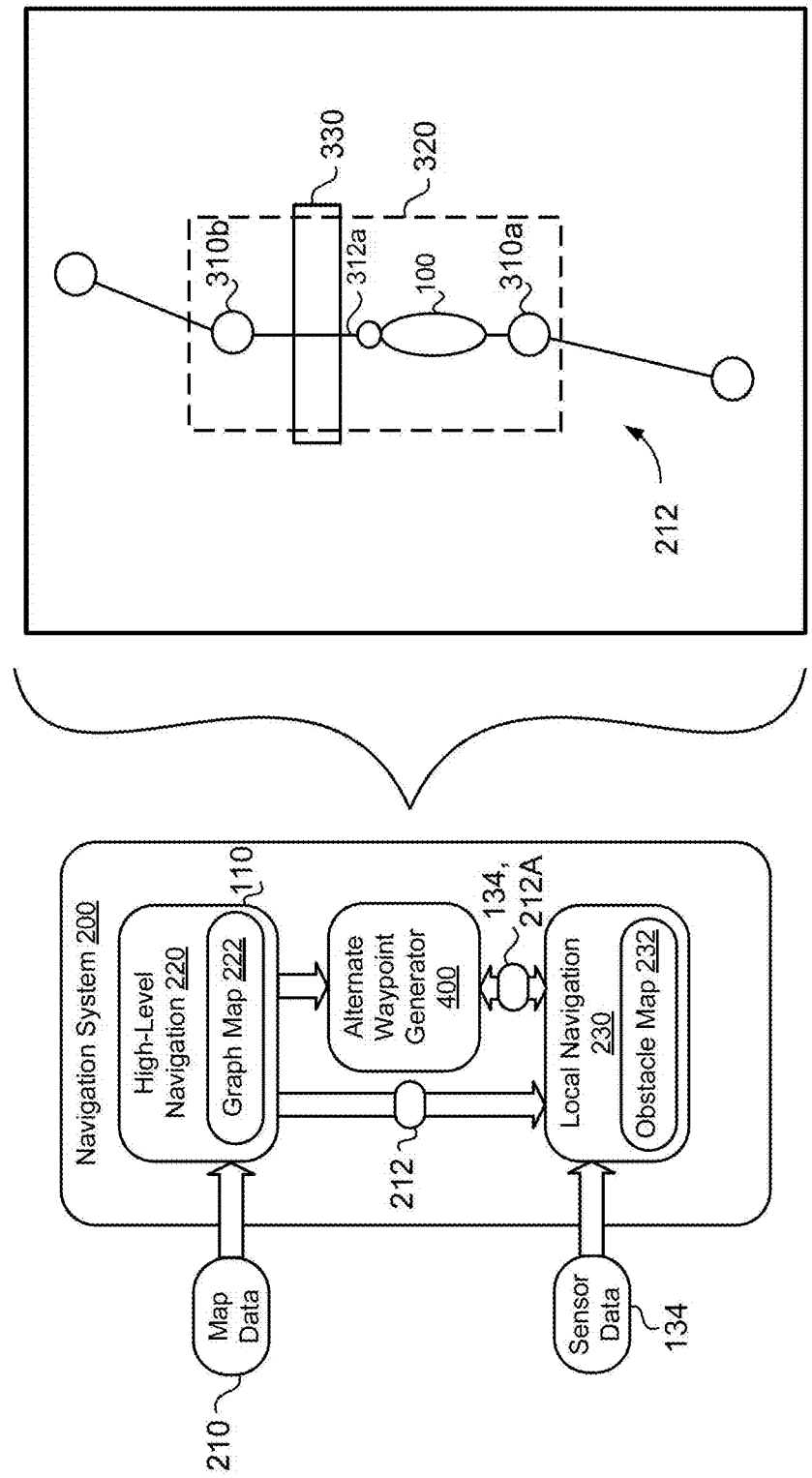
FIG. 4A is a schematic view of a robot encountering an obstacle and generating alternate waypoints to bypass the obstacle.

Referring now to FIG. 4A, in some examples, the navigation system 200 includes an alternate waypoint generator 400. The local navigation module 230 may obtain the sensor data 134 (e.g., image data) of the environment of the robot 100. The local navigation module 230 may determine, using the sensor data 134, that a corresponding one of the series of route edges 312a that connects the first route waypoint 310a and the second route waypoint 310b is blocked by an obstacle 330. For example, the local navigation module 230 may determine that the route edge is blocked, as the robot 100 navigates along the navigation route 212 from a first route waypoint 310a to a second route waypoint 310b. In the example of FIG. 4A, as the robot 100 navigates the navigation route 212 by traversing along the route edge 312a that connects the route waypoint 310a and the route waypoint 310b, the robot 100 encounters the obstacle 330 that blocks the route edge 312a. Because the obstacle 330 intersects the width of the boundary constraint 320 (which may correspond to a size of the obstacle map 232), the robot 100 may be unable to determine a route around the obstacle 330 and may remain within the boundary constraint 320.

Figure 4B:
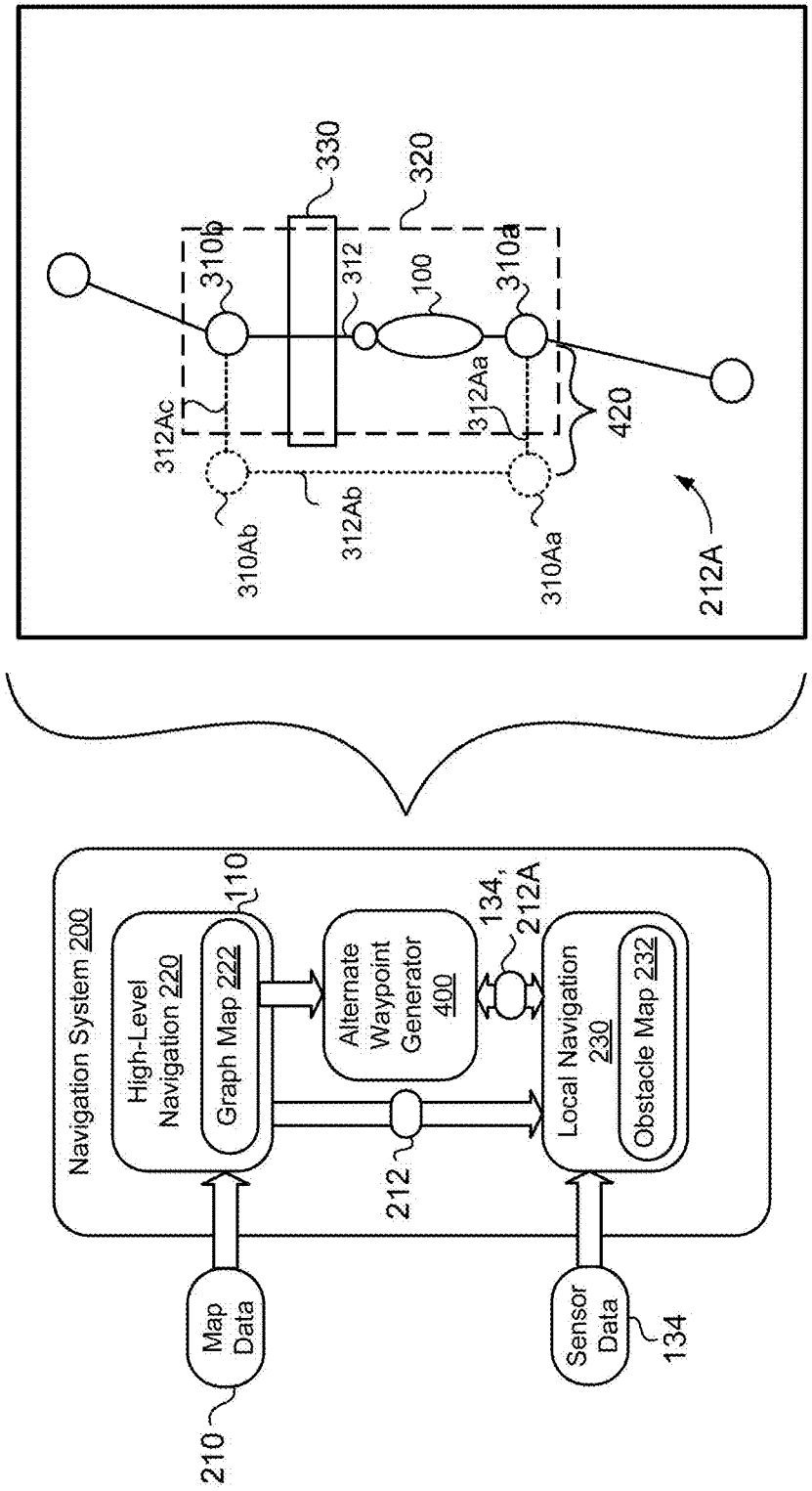
FIG. 4B is a schematic view of a robot encountering an obstacle and generating alternate waypoints to bypass the obstacle.

Referring now to FIG. 4B, the alternate waypoint generator 400 may receive the sensor data 134 (or a derivative of the sensor data 134 such as the obstacle map 232) and the graph map 222 with the navigation route 212A. The alternate waypoint generator 400 can generate, using the sensor data 134 and the graph map 222, one or more alternate waypoints 310Aa, b each offset from one of the route waypoints 310a, b by an offset distance 420. The offset distance 420 may be correlated with an operations range of the sensor(s) (e.g., the offset distance is less than the operational range of the sensor(s), such as an image sensor, LIDAR sensor, LADAR sensor, etc.). A user computing device may provide information indicating the offset distance. Further, the offset distance 420 may be based on a number of factors, including the environment the robot 100 is traversing. In some implementations, the alternate waypoint generator 400 may use sensor data 134 from one or more sensors that is different than the original sensor(s) 132 used to capture sensor data 134 associated with the obstacle 330 and/or the boundary constraint 320. For example, the robot 100 may primarily operate on image data captured by a camera to reduce computational resources. However, the alternate waypoint generator 400 may process longer-range data (e.g., captured by a different sensor such as a LIDAR sensor) that is more computationally expensive than the image sensor so that the alternate waypoint generator 400 may generate alternate waypoints 310Aa, b and/or alternate edges 312Aa, b, c further from the original route 212A (when there are no obstacles 330) than the alternate waypoint generator 400 otherwise would be able to with the sensor data 134.

For all or a portion of the alternate waypoints 310Aa, b, the alternate waypoint generator 400 may generate a respective alternate edge 312Aa, b, c connecting the alternate waypoint 310Aa, b to a respective route waypoint 310a, b. In some examples, the alternate waypoint generator 400 determines a correspondence between all or a portion of the alternate waypoints 310Aa, b and a route waypoint 310a, b. For all or a portion of the correspondence, if the robot 100 determines that the traversability of the straight-line region from the alternate waypoint 310Aa, b to the corresponding route waypoint 310a, b is greater than a threshold value (e.g., the robot 100 determines that the robot can traverse the straight-line region), the alternate waypoint generator 400 generates the alternate edge 312Aa, b, c and confirms the alternate waypoint 310Aa, b. In some implementations, when the robot 100 determines that the traversability of the straight-line region from the alternate waypoint 310Aa, b to the corresponding route waypoint 310a, b is below a particular threshold value, the alternate waypoint generator 400 may adjust the location of the alternate waypoint 310Aa, b (e.g., within a threshold distance of the original location) and may evaluate the path again.

In the example of FIG. 4B, the alternate waypoint generator 400 may generate alternate waypoints 310Aa and 310Ab. The alternate waypoint 310Aa is connected to the route waypoint 310a via the alternate edge 312Aa and the alternate waypoint 310Ab is connected to the route waypoint 310b via the alternate edge 312Ac. Further, the alternate waypoints 310Aa, 310Ab are connected via the alternate edge 312Ab.

The alternate waypoint generator 400 may generate alternate edges 312Aa, b, c between pairs of alternate waypoints 310Aa, b when all or a portion of the alternate waypoints 310Aa, b satisfy one of the following criteria. A first criteria is satisfied when all or a portion of the alternate waypoints 310Aa, b connect to the same route waypoint 310a, b. A second criteria is satisfied when all or a portion of the alternate waypoints 310Aa, b connect to an end of a single route edge 312. A third criteria is satisfied when all or a portion of the alternate waypoints 310Aa, b connect to one of two route waypoints 310a, b that have a particular path length between the two route waypoints 310a, b (e.g., a path length with a length below or equal to a particular threshold value, a normal path length, etc.). If the third criteria is satisfied, as discussed in more detail below, the alternate waypoint generator 400 may increase a cost of the corresponding alternate edge 312Aa, b, c to maintain a preference for the original navigation route 212. The alternate waypoint generator 400 may perform all or a portion of the traversability checks performed on the route edge 312 on all or a portion of the alternate edges 312, 312A. Thus, the alternate waypoint generator 400 may minimize the extent to which the region of allowed space around any alternate edge 312Aa, b, c duplicates the region of allowed space around any route edge 312. Therefore, the alternate waypoint generator 400 can minimize the overlap of the boundary constraint 320 and any new boundary constraints established by the alternate edges 312Aa, b, c based on sensor and/or computation constraints. As detecting that an edge is not traversable at playback time is time consuming and has an increased risk of the robot 100 falling while trying to traverse a blocked and/or modified area, it may be important to minimize the overlap. Because the alternate edges 312Aa, b, c may not traverse redundant areas of space (or the amount of traversed redundant space may be reduced), the alternate edges 312Aa, b, c can maximize the regions available to the robot without duplicating potentially blocked regions.

The alternate waypoint generator 400 may adjust the navigation route 212 to include at least one of the one or more alternate waypoints 310Aa, b that bypass the route edge(s) 312 blocked by the obstacle 330. As discussed in more detail below, in some implementations, the alternate waypoint generator 400 generates the alternate waypoints 310Aa, b using a polyline buffer algorithm. The alternate waypoint generator 400 may apply one or more polyline buffer algorithms to a flattened two-dimensional map (e.g., the graph map 222) to generate candidate alternate waypoints 310Aa, b. The alternate waypoint generator 400 may evaluate all or a portion of the candidate alternate waypoints 310Aa, b using one or more constraints and/or checks to verify the validity of the candidate alternate edge. For example, the alternate waypoint generator 400 can perform collision checking via signed distance fields, perform ground-height variation checks, determine a maximum recorded and/or nominal path length bypassed by the candidate alternate waypoint 310Aa, b, and/or check for compatibility with user configuration options (e.g., the user may disable alternate waypoint 310Aa, b generation in some scenarios). When the candidate alternate waypoint 310Aa, b passes all or a portion of the checks and/or constraints, the alternate waypoint generator 400 may confirm the alternate waypoint 310Aa, b for inclusion in the graph map 222 and/or the adjusted navigation route 212A. The alternate waypoint generator 400 may perform similar checks and evaluations for candidate alternate edges 312Aa, b, c along with appropriate additional checks (e.g., determining whether the alternate edge causes a maximum recorded or nominal path length to be exceeded).

Figure 4C:
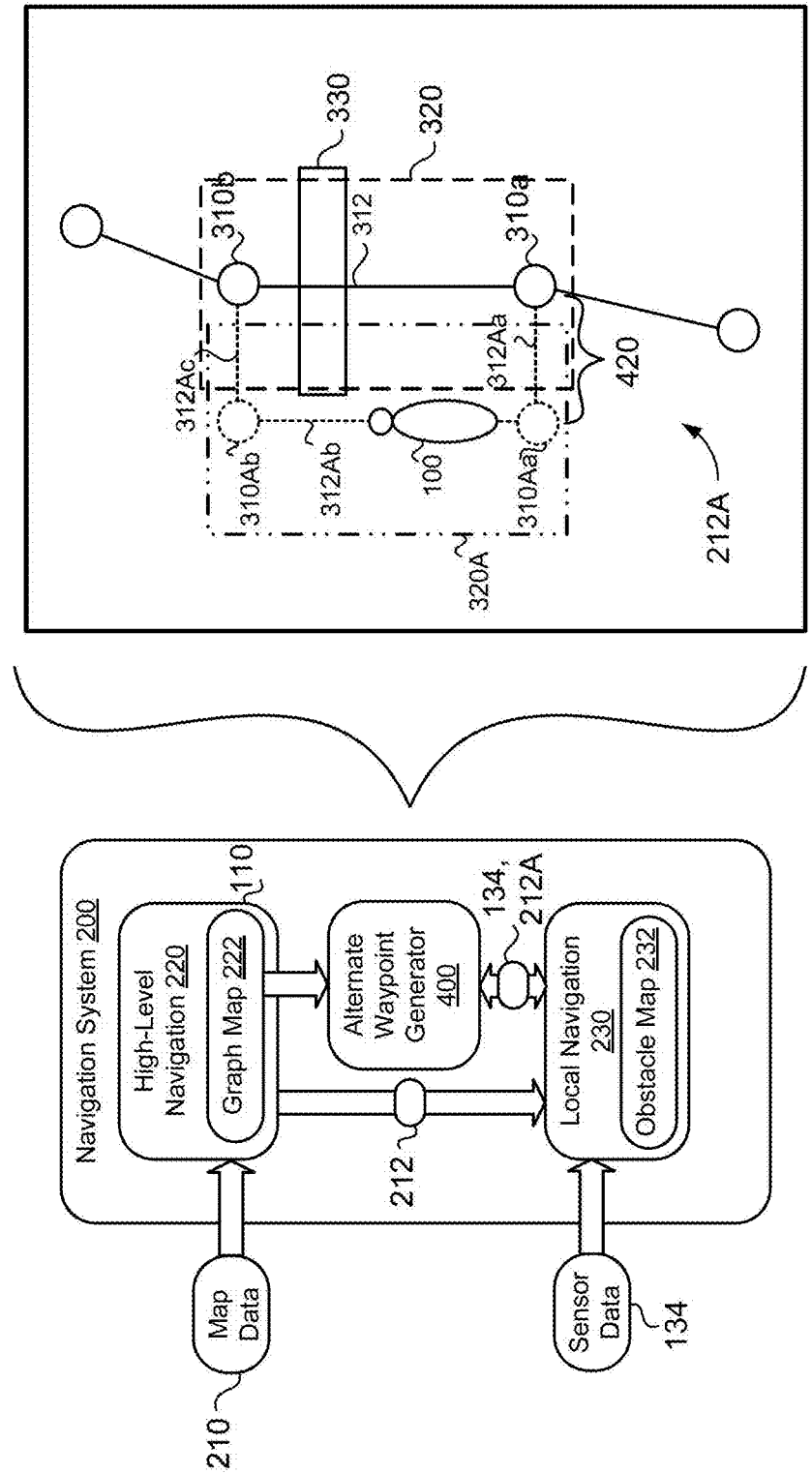
FIG. 4C is a schematic view of a robot encountering an obstacle and generating alternate waypoints to bypass the obstacle.

As shown in FIG. 4C, the local navigation module 230 may receive the adjusted navigation route 212A and navigate the robot 100 accordingly. The adjusted navigation route 212A may include one or more adjusted boundary constraints 320A. An additional boundary constraint 320A centered on the alternate edge 312A may enable the robot 100 the freedom to traverse the alternate edges 312Aa, b, c. The alternate waypoint generator 400 may generate new boundary constraints 320 (or, alternatively, adjust current boundary constraints 320) based on the generated alternate waypoints 310Aa, b and/or alternate edges 312Aa, b, c. The adjusted navigation route 212A includes the alternate waypoints 310Aa, 310Ab and the robot 100 navigates (e.g., first) to the alternate waypoint 310Aa via the edge 312Aa to the second alternate waypoint 310Ab via the edge 312Ab. The local navigation module 230 may navigate the robot 100 from a route waypoint 310a to an alternate waypoint 310Aa, b included in the adjusted navigation route 212A by traversing the robot 100 along the respective alternate edge 312Aa, b, c connecting the alternate waypoint 310Aa, b to the route waypoint 310a. In this example, the robot 100 may bypass the obstacle 330 utilizing the alternate waypoints 310Aa, b and return to the original navigation route 212 at the route waypoint 310b.

In some examples, the navigation system 200 determines that (e.g., while traversing an obstacle 330) an alternate edge 312Aa, b, c connecting an alternate waypoint 310Aa, b and a route waypoint 310b or another alternate waypoint 310Aa, b, c is blocked (e.g., by the same obstacle 330 blocking the route waypoint 312 or a separate obstacle 330). The navigation system 200 may readjust the adjusted navigation route 212A to include one or more additional alternate waypoints 310Aa, b. The readjusted navigation route 212A thus bypasses the blocked alternate edge 312Aa, b, c.

In some implementations, all or a portion of the route waypoints 310a, b, the alternate waypoints 310Aa, b, the route edge 312, and/or the alternate edges 312Aa, b, c is associated with a respective cost. The navigation system 200, when determining the navigation route 212 and the adjusted navigation route 212A, may obtain the cost associated with all or a portion of the waypoints 310a, b, 310Aa, b and/or edges 312, 312Aa, b, c. The navigation system 200 may generate the adjusted navigation route 212A using the route edges 312 and alternate edges 312Aa, b, c (and or waypoints 310, 310Aa, b) that have a lowest aggregate cost. In some embodiments, route edges 312 have a lower cost than alternate edges 312Aa, b, c to incentivize the robot 100 to return to the original navigation route 212 after bypassing the obstacle 330 (e.g., as soon as possible after bypassing the obstacle 330).

Figure 5A:
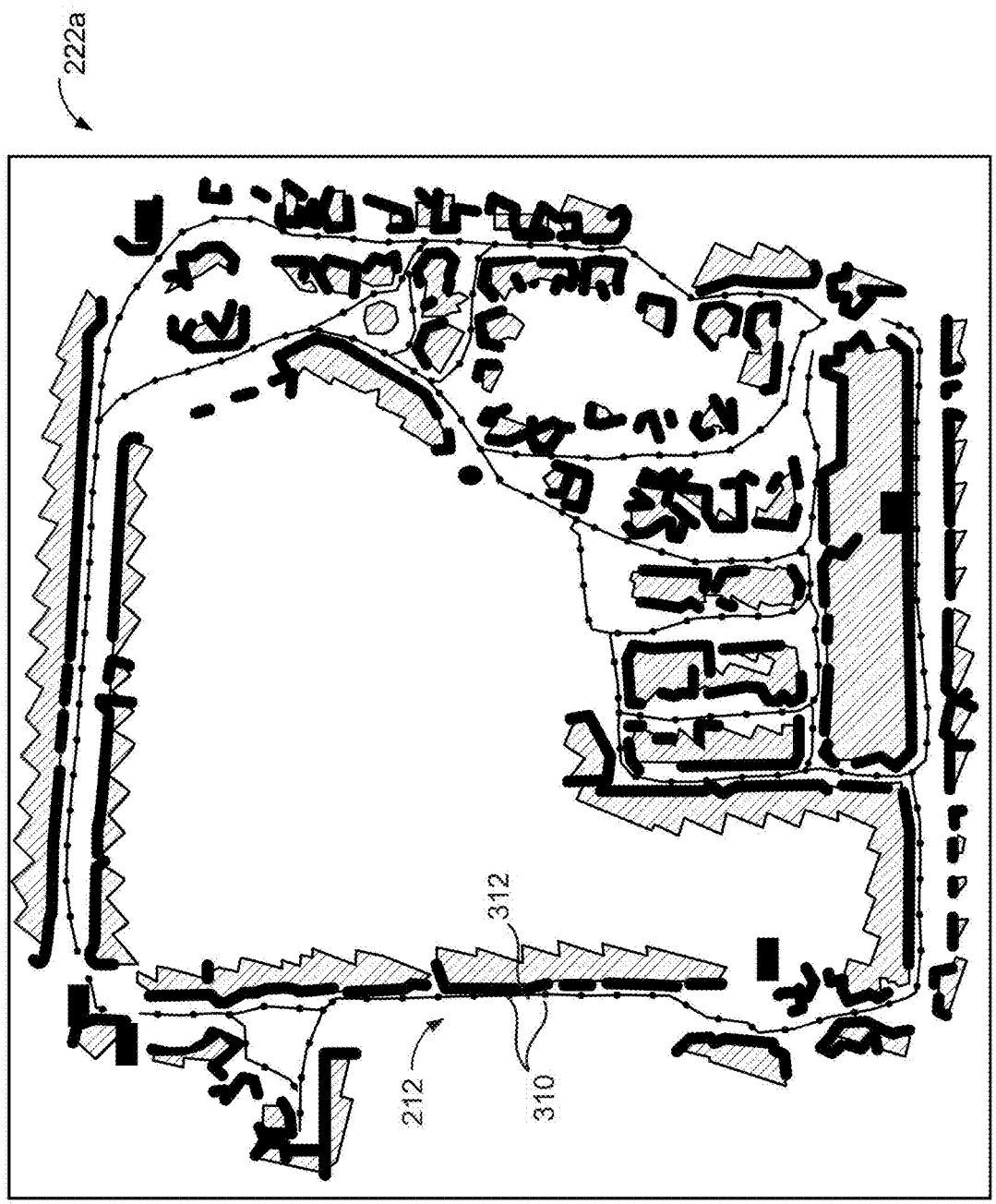
FIG. 5A is a schematic view of an exemplary graph map.

Referring now to FIG. 5A, an exemplary graph map 222a includes a navigation route 212 populated with a series of route waypoints 310 connected by route edges 312. In some examples, the graph map 222a is generated based on sensor data captured by a robot during a previous mission. For example, the robot may autonomously or semi-autonomously (e.g., at least partially manually controlled by a user computing device) traverse an environment while performing simultaneous localization and mapping (SLAM). The robot may periodically or aperiodically "drop" a route waypoint 310 as the robot traverses the environment. The robot may capture sensor data (e.g., using the sensor system) at all or a portion of the route waypoints 310 to generate the graph map 222a.

Figure 5B:
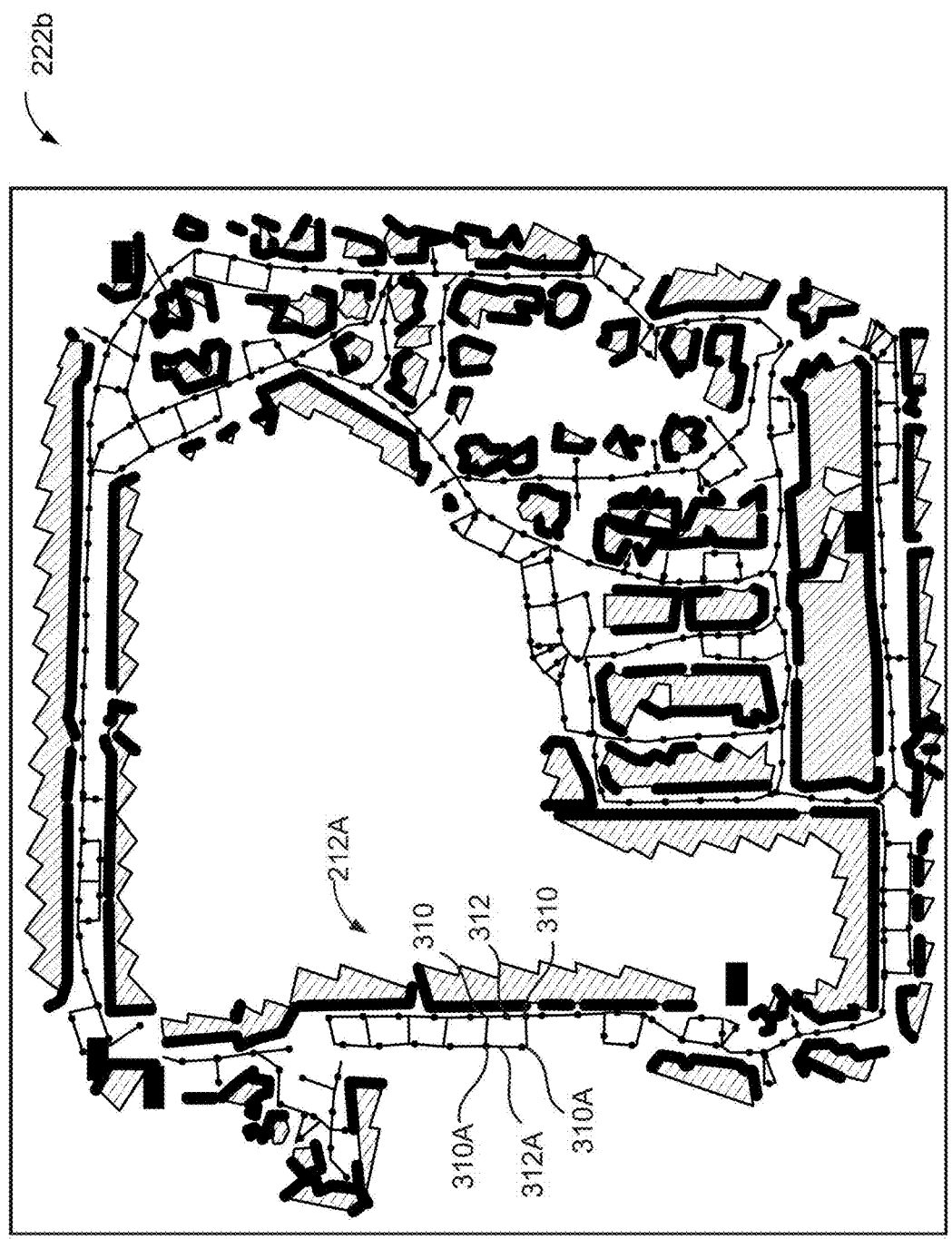
FIG. 5B is a schematic view of an exemplary graph map.

Referring now to FIG. 5B, an exemplary graph map 222b includes an adjusted navigation route 212A (e.g., an adjusted version of the navigation route as shown in FIG. 5A) populated with a series of route waypoints 310 connected by the same route edges 312. The navigation route 212A is populated with alternate waypoints 310A (and the corresponding alternate edges 312A) at all applicable locations throughout the graph map 222b. In some implementations, the alternate waypoint generator generates an alternate waypoint 310A at every location on the graph map 222 that meets the criteria for alternate waypoint 310A generation. The criteria for generating an alternate waypoint 310A may include sufficient distance (e.g., the offset distance) between a respective route waypoint 310 and obstacles represented in the graph map 222b. Therefore, the alternate waypoint generator may generate alternate waypoints 310A based on the alternate waypoint generator determining (via the data from the graph map 222b) that there is sufficient room for the robot to traverse the alternate waypoint 310A without colliding with an obstacle indicated by the graph map 222b.

Figure 5C:
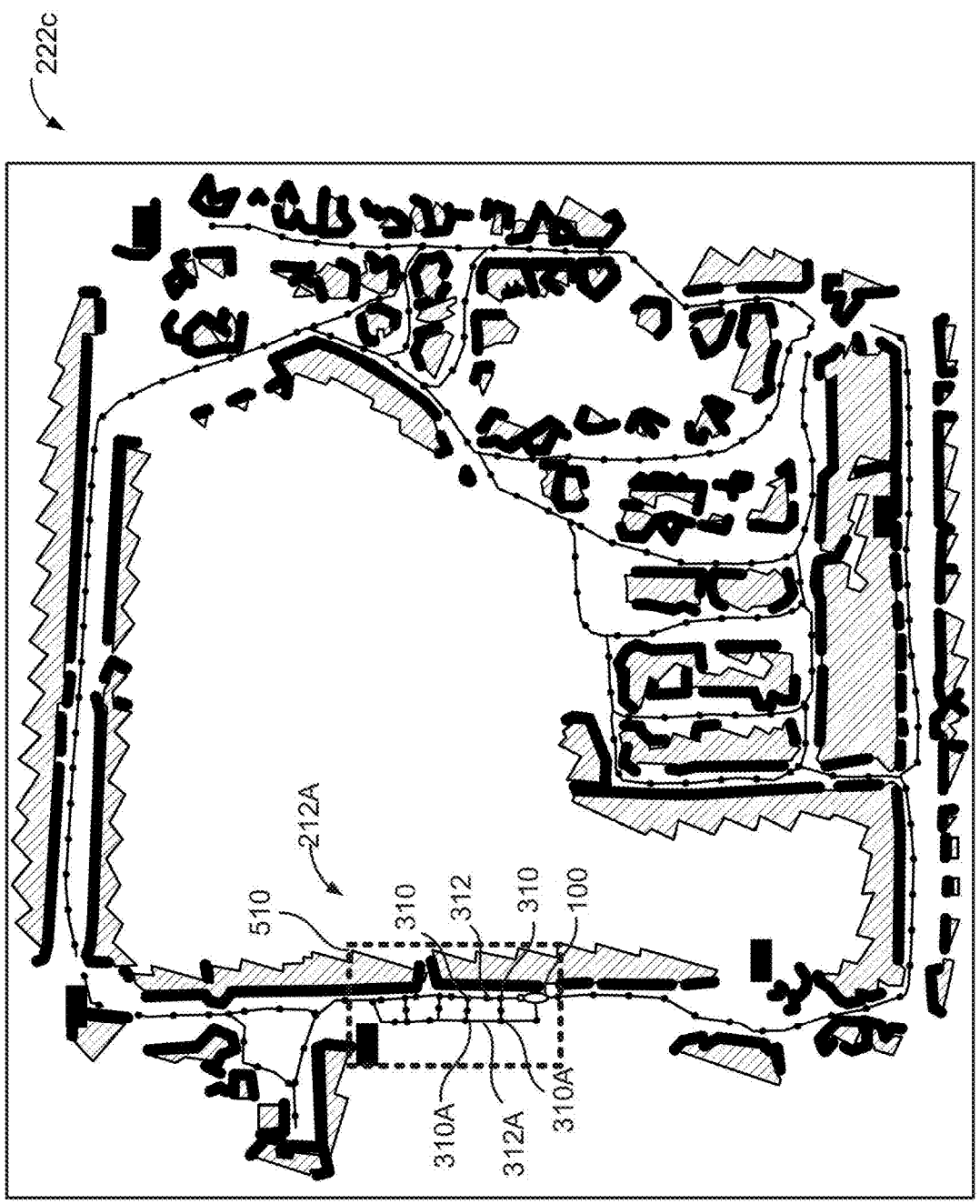
FIG. 5C is a schematic view of an exemplary graph map.

Referring now to FIG. 5C, in some examples, the alternate waypoint generator may generate alternate waypoints 310A within a threshold distance of the robot. An exemplary graph map 222c indicates a current position of the robot and a bounding box 510 that represents a valid area for the alternate waypoint generator to generate alternate waypoints 310A. By constraining the area that the alternate waypoint generator generates alternate waypoints 310A, the navigation system 200 may reduce resources (e.g., computational or temporal) necessary to generate the adjusted navigation route 212A. In these examples, the alternate waypoint generator may generate alternate waypoints 310A near a current location of the robot all or a portion of the times the robot's progress is impeded (e.g., the robot gets "stuck"). The threshold distance may vary based on direction from the robot. For example, the alternate waypoint generator may generate alternate waypoints 310A that are within a first threshold distance in front of the robot (e.g., ten meters, twenty meters, thirty meters, thirty-five meters, etc.) and within a second threshold distance behind the robot (e.g. five meters, ten meters, twenty meters, etc.).

Figure 6A:
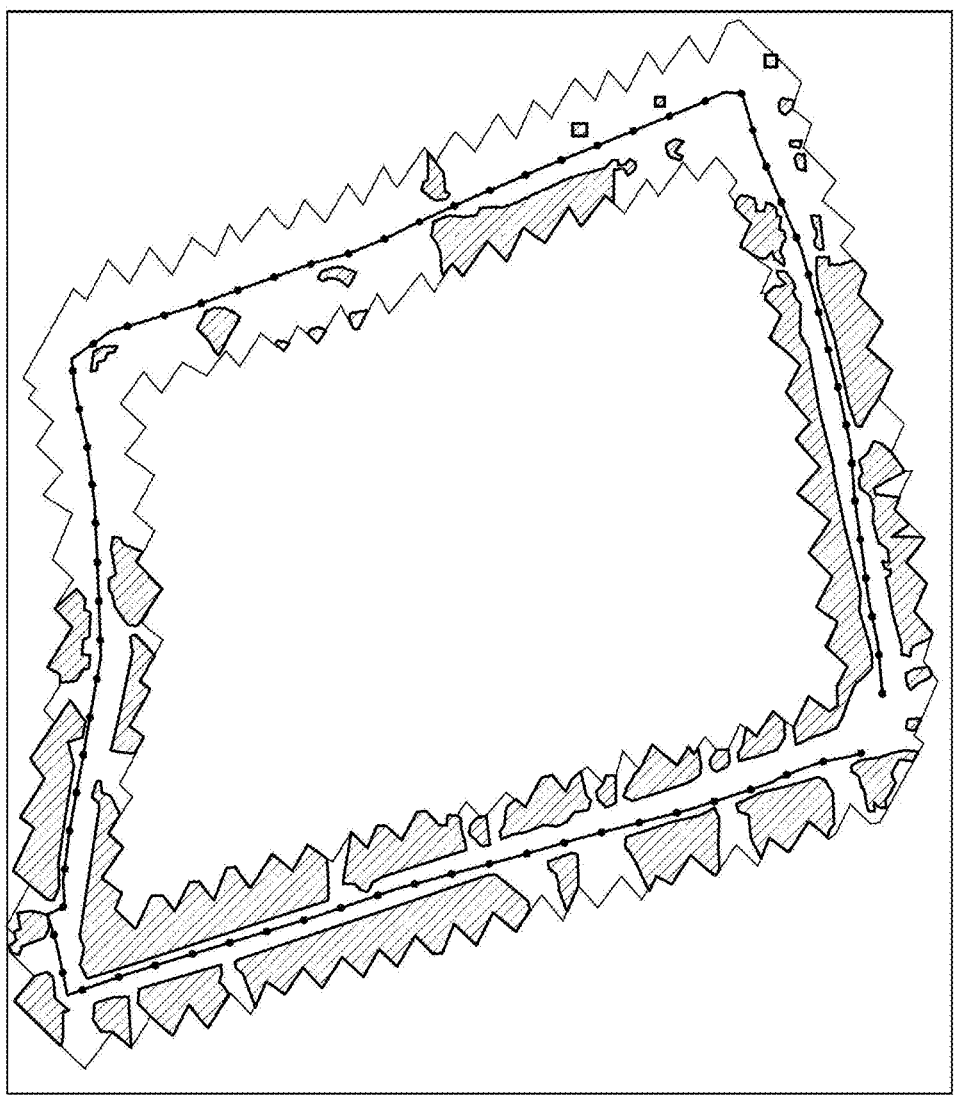
FIG. 6A is a schematic view of an exemplary graph map with candidate alternate waypoints.
Figure 6B:
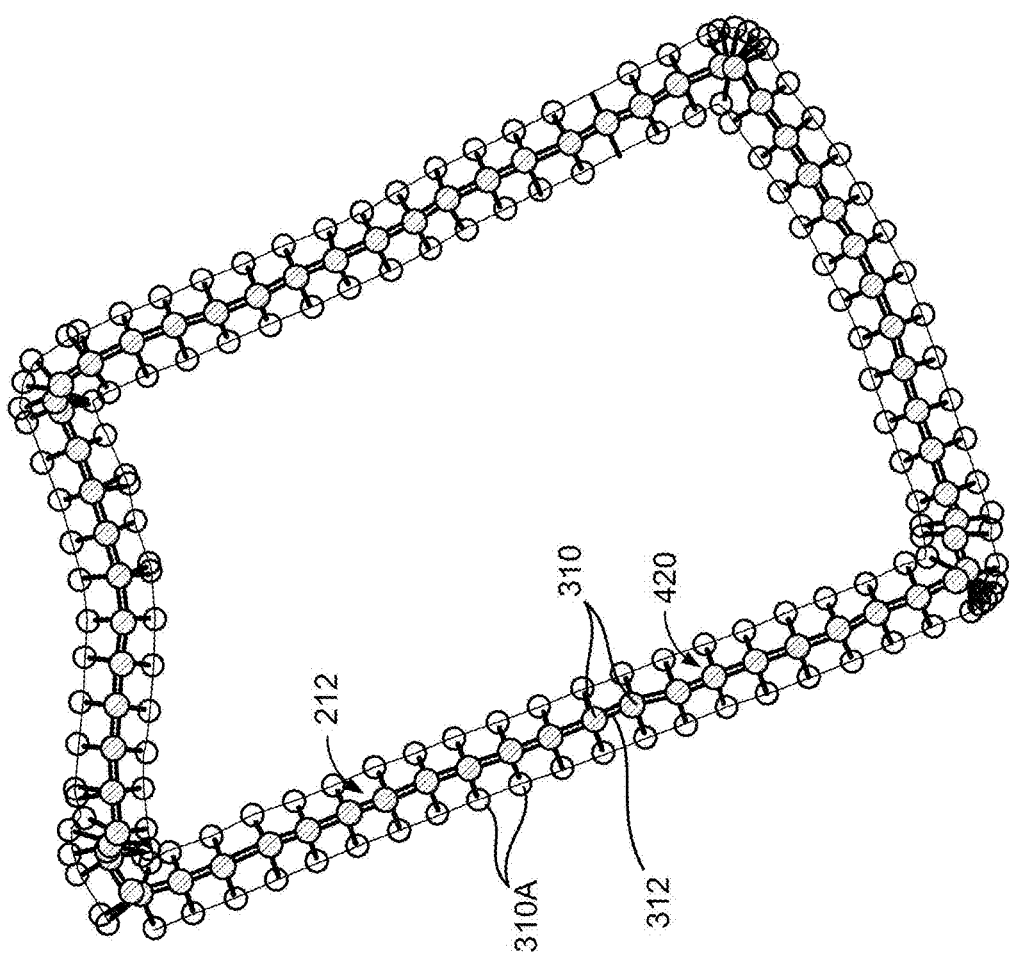
FIG. 6B is a schematic view of an exemplary graph map with candidate alternate waypoints.
Figure 6C:
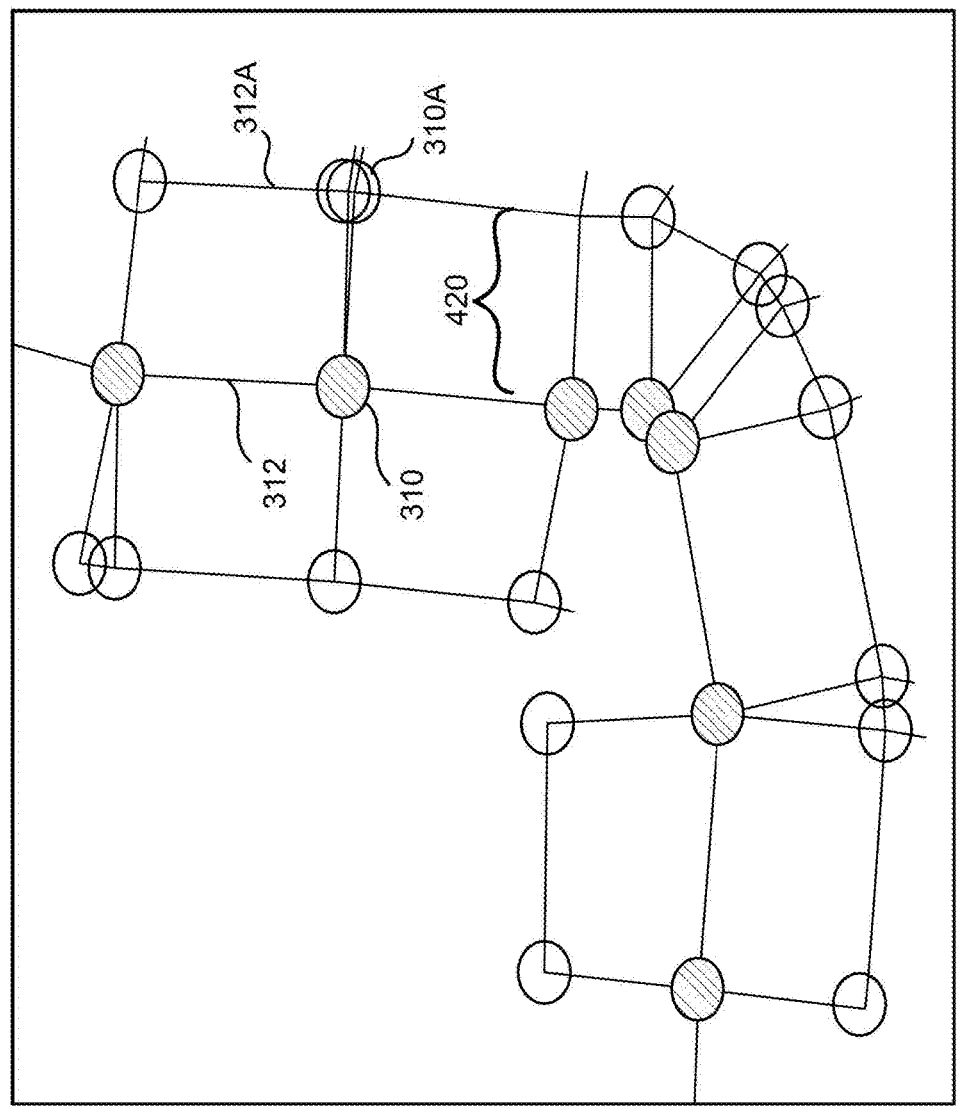
FIG. 6C is a schematic view of an exemplary graph map with candidate alternate waypoints.

Referring now to FIGS. 6A-6C, in some implementations, the alternate waypoint generator generates several candidate alternate waypoints. As shown in the schematic view 600a of FIG. 6A, the high-level navigation module may initially generate the graph map using inputs such as the desired path (e.g., a prior recorded path selected by the user computing device or otherwise representative of the desired mission for the robot), point clouds generated from the sensor data captured by the sensor system, and/or local grid maps. A schematic view 600b of FIG. 6B illustrates exemplary candidate alternate waypoints generated from a graph map. The alternate waypoint generator may generate candidate alternate waypoints from all or a portion of the route waypoints. Each candidate alternate waypoint may be offset from the route waypoint by the offset distance. A schematic view 600c of FIG. 6C provides an enhanced view of the route waypoints, route edges, the candidate alternate waypoints, and the corresponding alternate edges. The navigation system may perform any number of constraint checks and/or evaluations prior to confirming all or a portion of the candidate alternate waypoints.

Figure 7A:
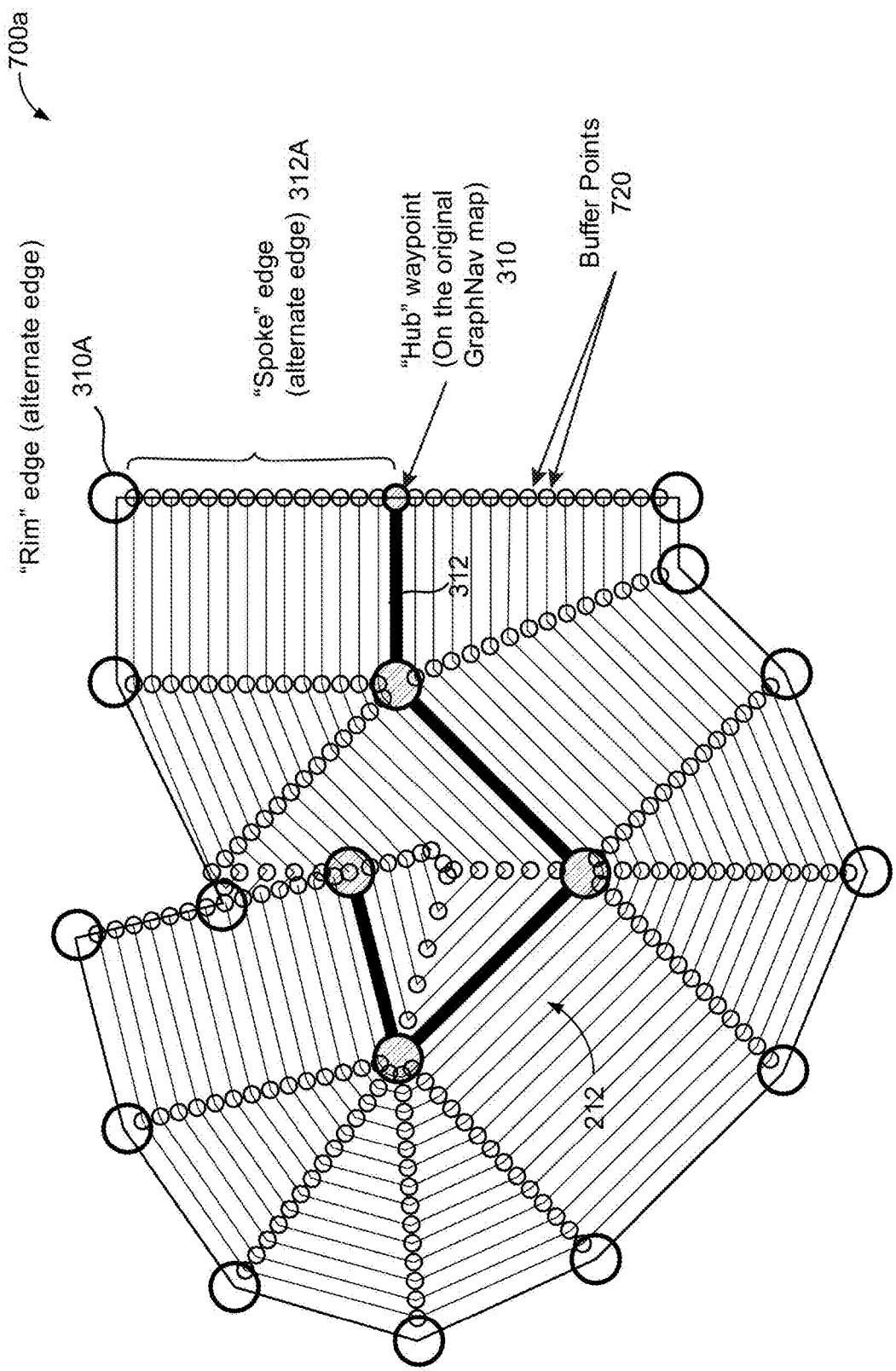
FIG. 7A is a schematic view of generating alternate waypoints and alternate edges using a polyline buffer algorithm.
Figure 7B:
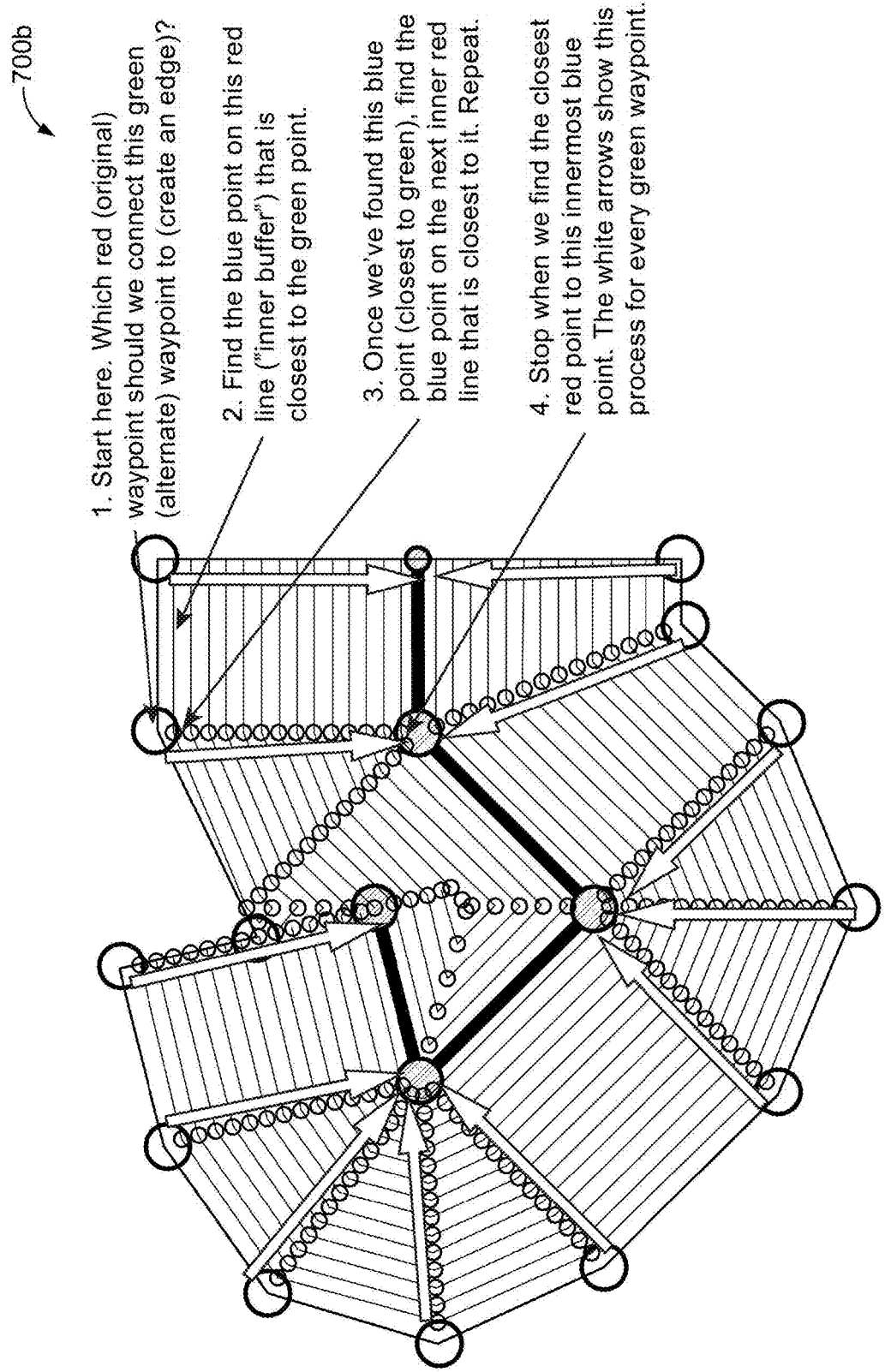
FIG. 7B is a schematic view of generating alternate waypoints and alternate edges using a polyline buffer algorithm.

Referring now to FIGS. 7A-7D, in some implementations, to generate the candidate alternate waypoints 310A and alternate edges 312A, the alternate waypoint generator determines chain transforms of one or more route waypoints 310 of the navigation route 212 (e.g., starting from the "oldest" route waypoint 310) and converts to two-dimensional geometry. As illustrated in schematic views 700a-d, the alternate waypoint generator may determine a series of offset polygons (e.g., "buffers") out to a threshold distance (e.g., 1.5 meters) using one or more polyline-buffer algorithms. The alternate waypoint generator, in some examples, iteratively corresponds the outermost ("rim") of the alternate waypoints 310A to the nearest point on the polygon buffer and evaluates the straight line (the "spoke" or alternate edge 312A) formed by buffer points 720 and the candidate alternate waypoint 310A. The alternate waypoint generator, in some examples, will skip a buffer point 720 when the buffer point 720 crosses a route edge 312 or when the buffer point 720 is within a threshold distance of a route waypoint 310. The alternate waypoint generator may also skip the buffer point 720 when the hub waypoint 310 crosses another spoke. The alternate waypoint generator computes new transforms for spokes (alternate edges 312A) and rim edges (alternate edges 312A between adjacent alternate waypoints 310A). In some examples, the alternate waypoint generator connects successive rim waypoints (alternate waypoints 310A) when the waypoints create a small loop. As seen in FIG. 7D, the alternate waypoint generator may determine whether the path between all or a portion of the alternate waypoints 310A of the candidate rim edge 312A (e.g., the shortest path as compared to other paths between the alternate waypoints 310A) satisfies a threshold.

The alternate waypoint generator may evaluate alternate edges 312A between alternate waypoints 310A to determine whether the alternate edges 312A satisfy one or more conditions. For example, the alternate edges 312A connecting adjacent alternate waypoints 310A may be required to be within a threshold distance of the nearest route waypoint 310. The alternate edges 312A may be evaluated by generating the buffer points 720 between all or a portion of the alternate waypoints 310A and route waypoint 310 closest (e.g., spatially) to the alternate waypoint 310A on the original graph map 222. The alternate edge 312A that the robot 100 is capable of navigating may be drawn between the alternate waypoint 310A and the route waypoint 310 along the corresponding buffer points 720 and this process may be iterated for all or a portion of the alternate waypoints 310A within the graph map 222 or within a threshold distance of the robot 100. For all or a portion of the alternate edges 312A connecting an alternate waypoint 310A and the route waypoint 310, the alternate waypoint generator may verify that all or a portion of the alternate edges 312A are free of obstacles and within the sensing threshold range of the robot 100. When the alternate edge 312A connecting the alternate waypoint 310A and the route waypoint 310 is not free of obstacles or within the sensing threshold range, the alternate waypoint generator may shorten or relocate the alternate waypoint 310A to bring the alternate edge 312A into compliance. Once the alternate waypoints 310A are evaluated (and in some implementations adjusted according to the alternate edges 312A connecting alternate waypoints 310A and the route waypoints 310), the alternate waypoint generator may evaluate the alternate edges 312A connecting adjacent alternate waypoints 310A to be free of obstacles and to be within a threshold distance of at least one route waypoint 310. Therefore, the alternate edges 312A connecting adjacent alternate waypoints 310A may not be within a sensing range of a current location of the robot (at a route waypoint 310) if the alternate edge 312A is within the threshold distance of another route waypoint 310.

Thus, the navigation system provides additional flexibility in a way that can be tuned and verified offline while runtime behavior remains deterministic. The robot may have a limited number of paths to avoid an obstacle or blockage of the nominal navigation route 212 and the navigation system may identify all or a portion of the paths. Additionally, the robot may return to the nominal (original) path after traversing the obstacle. The alternate waypoint generator may generate the alternate waypoints 310A and the alternate edges 312A either offline (e.g., prior to the robot traversing the navigation route 212) or online (e.g., after the robot has encountered the blocked route edge 312). For example, the alternate waypoint generator generates the alternate waypoints 310A prior to encountering a blocked route edge 312 (or route waypoint 310) and enables the alternate waypoints 310A after encountering the blocked route edge 312. Alternatively, the robot may rely on a higher cost of the alternate waypoint 310A to maintain the original navigation route 212 whenever possible. In other examples, the alternate waypoint generator generates the alternate waypoints 310A after encountering the blocked route edge 312. In some examples, the alternate waypoint generator may not generate alternate waypoint 310A in specified regions. For example, the user computing device may specify regions (e.g., via a controller) where alternate waypoints 310A are prohibited.

Figure 8:
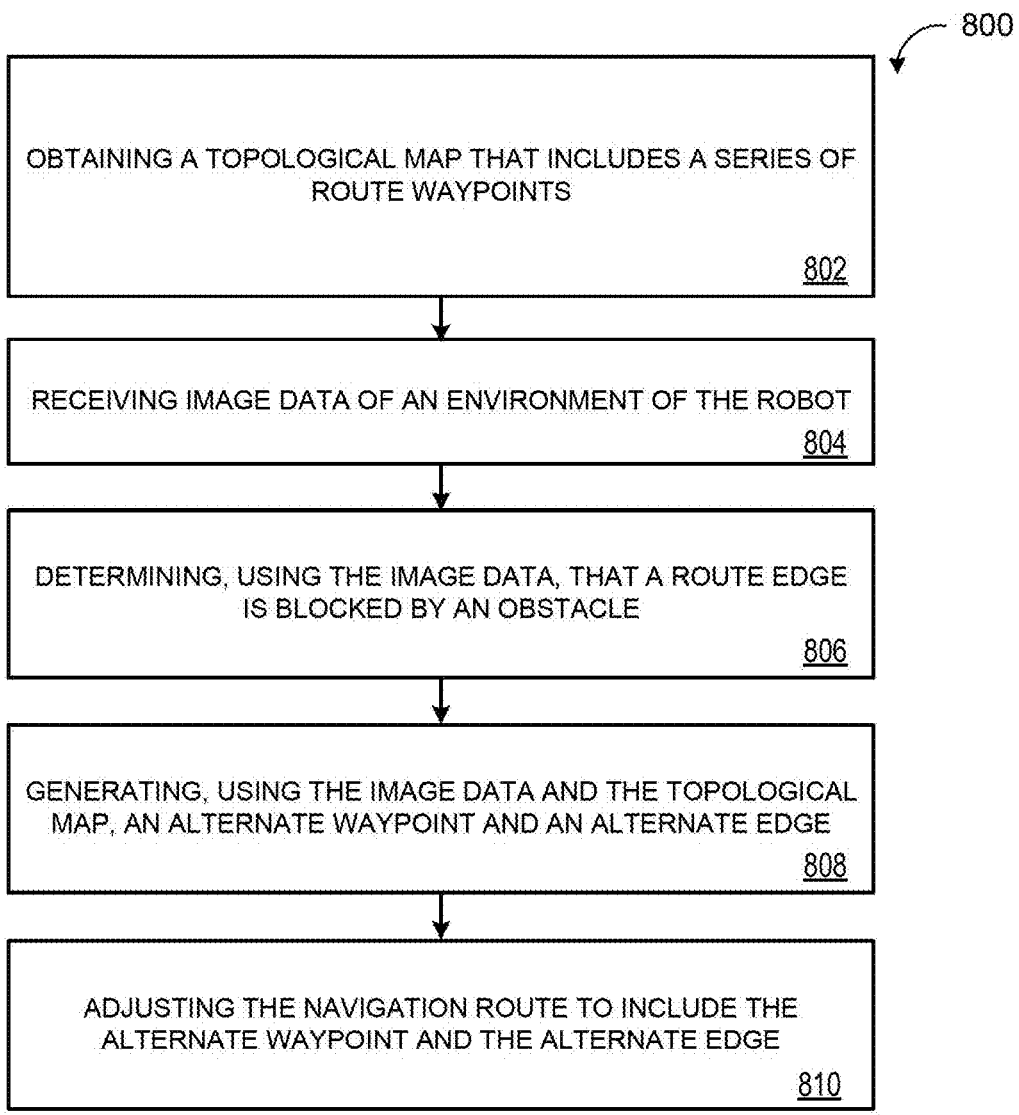
FIG. 8 is a flowchart of an example arrangement of operations for a method of alternate route finding processing for waypoint-based navigation maps.

FIG. 8 is a flowchart of an exemplary arrangement of operations for a method 800 of providing alternate route finding for waypoint-based navigation maps. The computer-implemented method 800, when executed by data processing hardware causes the data processing hardware to perform operations. At operation 802, the method 800 includes obtaining a topological map that includes a series of route waypoints. The topological map may further include a series of route edges. All or a portion of the route edges in the series of route edges may connect a corresponding pair of adjacent route waypoints in the series of route waypoints. The series of route waypoints and the series of route edges may be representative of a navigation route for a robot to follow from a start location to a destination location.

The method 800, at operation 804, includes receiving image data of an environment of the robot from an image sensor. At operation 806, determining, using the image data, that a route edge of the series of route edges is blocked by an obstacle. For example, the operation 806 may include determining that the route edge is blocked by the obstacle as the robot navigates along the navigation route from a first route waypoint in the series of route waypoints to a second route waypoint in the series of route waypoints. The route edge may connect the first route waypoint and the second route waypoint. The method 800, at operation 808, includes generating, using the image data and the topological map, an alternate waypoint and an alternate edge. The alternate waypoint may be offset from at least one route waypoint in the series of route waypoints by an offset distance. The alternate edge may connect the alternate waypoint to the first route waypoint. The operation 808 may include generating an alternate edge for all or a portion of a plurality of alternate waypoints. The method 800, at operation 810, includes adjusting the navigation route to include the alternate waypoint and the alternate edge. The alternate waypoint and the alternate edge may bypass the route edge blocked by the obstacle. In some embodiments, the method 800 includes navigating the robot from the first route waypoint to the alternate waypoint by traversing the robot along the alternate edge connecting the alternate waypoint to the first route waypoint.

Figure 9:
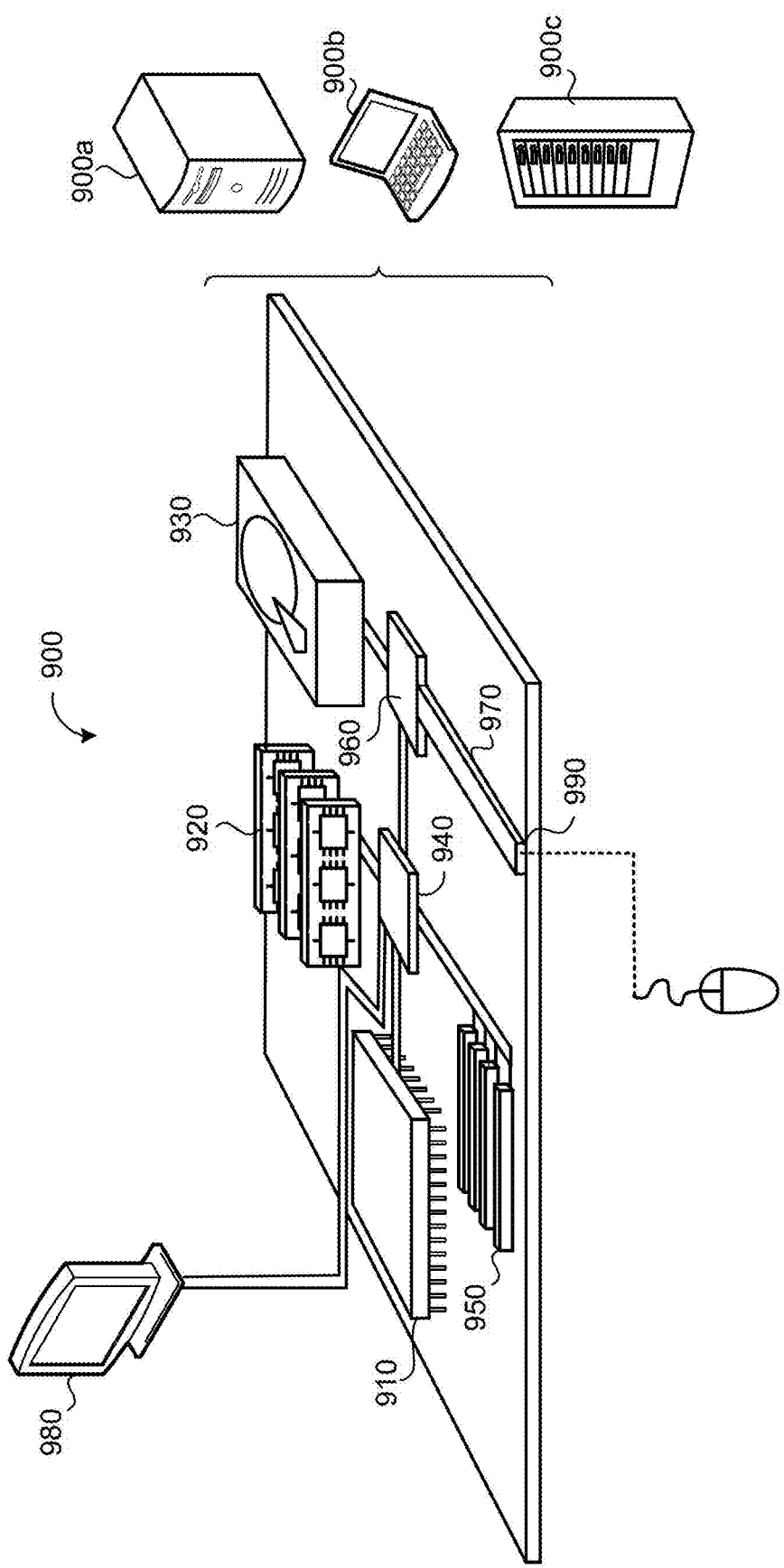
FIG. 9 is a schematic view of an example computing device that may be used to implement the systems and methods described herein.

FIG. 9 is schematic view of an example computing device 900 that may be used to implement the systems and methods described in this document. The computing device 900 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 900 includes a processor 910, memory 920, a storage device 930, a high-speed interface/controller 940 connecting to the memory 920 and high-speed expansion ports 950, and a low speed interface/controller 960 connecting to a low speed bus 970 and a storage device 930. Each of the components 910, 920, 930, 940, 950, and 960, are interconnected using various busses, and may be mounted on a common motherboard or in other manners as appropriate. The processor 910 can process instructions for execution within the computing device 900, including instructions stored in the memory 920 or on the storage device 930 to display graphical information for a graphical user interface (GUI) on an external input/output device, such as display 980 coupled to high speed interface 940. In other implementations, multiple processors and/or multiple buses may be used, as appropriate, along with multiple memories and types of memory. Also, multiple computing devices 900 may be connected, with each device providing portions of the necessary operations (e.g., as a server bank, a group of blade servers, or a multi-processor system).

The memory 920 stores information non-transitorily within the computing device 900. The memory 920 may be a computer-readable medium, a volatile memory unit(s), or non-volatile memory unit(s). The non-transitory memory 920 may be physical devices used to store programs (e.g., sequences of instructions) or data (e.g., program state information) on a temporary or permanent basis for use by the computing device 900. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 930 is capable of providing mass storage for the computing device 900. In some implementations, the storage device 930 is a computer-readable medium. In various different implementations, the storage device 930 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 920, the storage device 930, or memory on processor 910.

The high speed controller 940 manages bandwidth-intensive operations for the computing device 900, while the low speed controller 960 manages lower bandwidth-intensive operations. Such allocation of duties is exemplary only. In some implementations, the high-speed controller 940 is coupled to the memory 920, the display 980 (e.g., through a graphics processor or accelerator), and to the high-speed expansion ports 950, which may accept various expansion cards (not shown). In some implementations, the low-speed controller 960 is coupled to the storage device 930 and a low-speed expansion port 990. The low-speed expansion port 990, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 900a or multiple times in a group of such servers 900a, as a laptop computer 900b, or as part of a rack server system 900c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times. Furthermore, the elements and acts of the various embodiments described above can be combined to provide further embodiments. Indeed, the methods and systems described herein may be embodied in a variety of other forms; furthermore, various omissions, substitutions and changes in the form of the methods and systems described herein may be made without departing from the spirit of the disclosure. Accordingly, other implementations are within the scope of the following claims.

What is claimed is:

1. A computer-implemented method when executed by data processing hardware of a robot causes the data processing hardware to perform operations comprising:
   obtaining a navigation route for the robot, the navigation route comprising a first route waypoint, a second route waypoint, and a first route edge connecting the first route waypoint and the second route waypoint, wherein navigation by the robot according to the navigation route is constrained by a first constraint, wherein the first constraint is based on at least one of the first route waypoint or the second route waypoint;

receiving, from an image sensor, image data;

determining, using the image data and the first constraint, that the first route edge is at least partially blocked by an obstacle;

generating, using the image data and the navigation route, a first alternate route waypoint and a first alternate route edge connecting the first alternate route waypoint and the first route waypoint;

adjusting the navigation route to obtain an adjusted navigation route, the adjusted navigation route comprising the first alternate route waypoint and the first alternate route edge, wherein the first alternate route waypoint and the first alternate route edge bypass the first route edge that is at least partially blocked by the obstacle; and instructing the robot to navigate according to the adjusted navigation route.

2. The computer-implemented method of claim 1, wherein instructing the robot to navigate according to the adjusted navigation route comprises:

providing instructions to the robot;

wherein the operations further comprise;

executing, by the robot, the instructions, wherein, based on executing the instructions, the robot navigates from the first route waypoint to the first alternate route waypoint via the first alternate route edge.

3. The computer-implemented method of claim 1, wherein adjusting the navigation route comprises:

obtaining a first cost associated with the first route edge;

obtaining a second cost associated with the first alternate route edge; and determining the adjusted navigation route based on the first cost and the second cost.

4. The computer-implemented method of claim 3, wherein the second cost is less than the first cost.

5. The computer-implemented method of claim 1, wherein the first alternate route waypoint is offset from the second route waypoint by an offset distance associated with the image sensor.

6. The computer-implemented method of claim 1, wherein the operations further comprise:

generating a second alternate route edge connecting the first alternate route waypoint and a second alternate route waypoint.

7. The computer-implemented method of claim 6, wherein the operations further comprise:

determining that the second alternate route edge is at least partially blocked; and readjusting the navigation route to obtain a readjusted navigation route, the readjusted navigation route comprising a third alternate route waypoint.

8. The computer-implemented method of claim 1, wherein generating the first alternate route waypoint comprises:

generating the first alternate route waypoint based on a polyline buffer.

9. The computer-implemented method of claim 1, wherein generating the first alternate route waypoint comprises:

generating one or more alternate route waypoints within a threshold distance of a location of the robot.

10. The computer-implemented method of claim 1, wherein the navigation route is based on one or more locations of one or more obstacles.

11. The computer-implemented method of claim 1, wherein navigation by the robot according to the adjusted navigation route is constrained by a second constraint.

12. The computer-implemented method of claim 1, wherein generating the first alternate route waypoint comprises:

generating at least two alternate route waypoints and at least two alternate route edges, each alternate route edge of the at least two alternate route edges connecting a respective alternate route waypoint of the at least two alternate route waypoints and the first route waypoint.

13. A system comprising:

data processing hardware of a robot; and memory hardware in communication with the data processing hardware, the memory hardware storing instructions that when executed on the data processing hardware cause the data processing hardware to perform operations comprising:

obtaining a navigation route for the robot, the navigation route comprising a first route waypoint, a second route waypoint, and a first route edge connecting the first route waypoint and the second route waypoint, wherein navigation by the robot according to the navigation route is constrained by a first constraint, wherein the first constraint is based on at least one of the first route waypoint or the second route waypoint;

receiving, from an image sensor, image data;

determining, using the image data and the first constraint, that the first route edge is at least partially blocked by an obstacle;

generating, using the image data and the navigation route, a first alternate route waypoint and a first alternate route edge connecting the first alternate route waypoint and the first route waypoint;

adjusting the navigation route to obtain an adjusted navigation route, the adjusted navigation route comprising the first alternate route waypoint and the first alternate route edge, wherein the first alternate route waypoint and the first alternate route edge bypass the first route edge that is at least partially blocked by the obstacle; and instructing the robot to navigate according to the adjusted navigation route.

14. The system of claim 13, wherein instructing the robot to navigate according to the adjusted navigation route comprises:

providing instructions to the robot;

wherein the operations further comprise:

executing, by the robot, the instructions, wherein, based on executing the instructions, the robot navigates from the first route waypoint to the first alternate route waypoint via the first alternate route edge.

15. The system of claim 13, wherein adjusting the navigation route comprises:

obtaining a first cost associated with the first route edge;

obtaining a second cost associated with the first alternate route edge; and determining the adjusted navigation route based on the first cost and the second cost.

16. The system of claim 15, wherein the second cost is less than the first cost.

17. The system of claim 13, wherein the first alternate route waypoint is offset from the second route waypoint by an offset distance associated with the image sensor.

18. The system of claim 13, wherein the operations further comprise;
generating a second alternate route edge connecting the first alternate route waypoint and a second alternate route waypoint.

19. The system of claim 18, wherein the operations further comprise:
determining that the second alternate route edge is at least partially blocked; and
readjusting the navigation route to obtain a readjusted navigation route, the readjusted navigation route comprising a third alternate route waypoint.

20. The system of claim 13, wherein generating the first alternate route waypoint comprises;
generating the first alternate route waypoint based on a polyline buffer.

21. The system of claim 13, wherein generating the first alternate route waypoint comprises:
generating one or more alternate route waypoints within a threshold distance of a location of the robot.

22. The system of claim 13, wherein the navigation route is based on one or more locations of one or more obstacles.

23. The system of claim 13, wherein navigation by the robot according to the adjusted navigation route is constrained by a second constraint.

24. The system of claim 13, wherein generating the first alternate route waypoint comprises:
generating at least two alternate route waypoints and at least two alternate route edges, each alternate route edge of the at least two alternate route edges connecting a respective alternate route waypoint of the at least two alternate route waypoints and the first route waypoint.

* * * * *